(12) United States Patent
Lee et al.

(10) Patent No.: US 12,254,843 B2
(45) Date of Patent: Mar. 18, 2025

(54) DISPLAY APPARATUS FOR GENERATING COMMON PART IN DIFFERENT DISPLAY AREAS, HEAD MOUNTED DISPLAY SYSTEM HAVING THE SAME AND METHOD OF DRIVING THE DISPLAY APPARATUS

(71) Applicant: Samsung Display Co., Ltd., Yongin-Si (KR)

(72) Inventors: Cheonmyeong Lee, Seoul (KR); Sang-Ho Kim, Gwangmyeong-si (KR); Soomin Baek, Hwaseong-si (KR); Jiwon Lee, Suwon-si (KR); Juhwa Ha, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 436 days.

(21) Appl. No.: 17/567,479

(22) Filed: Jan. 3, 2022

(65) Prior Publication Data

US 2022/0254312 A1  Aug. 11, 2022

(30) Foreign Application Priority Data

Feb. 5, 2021 (KR) .......................... 10-2021-0016460

(51) Int. Cl.
*G09G 3/3291* (2016.01)
*G02B 27/01* (2006.01)
*G09G 5/00* (2006.01)

(52) U.S. Cl.
CPC ....... *G09G 3/3291* (2013.01); *G02B 27/0172* (2013.01); *G09G 5/006* (2013.01);
(Continued)

(58) Field of Classification Search
CPC .......... G09G 3/007; G09G 3/30–3291; G09G 5/006; G09G 2300/046; G09G 2310/0216;
(Continued)

(56) References Cited

U.S. PATENT DOCUMENTS 10,690,923 B1 * 6/2020 Luanava ................ G02B 26/08
2008/0068331 A1   3/2008 Sugawara et al.
(Continued)

FOREIGN PATENT DOCUMENTS

KR   1020200083736 A   7/2020
WO      2015077718 A1   5/2015

OTHER PUBLICATIONS

Extended European Search Report for Application No. 22155079.1-1210 dated Sep. 1, 2022 enumerating the above listed references in the Extended European Search Report.

*Primary Examiner* — Keith L Crawley
(74) *Attorney, Agent, or Firm* — CANTOR COLBURN LLP

(57) ABSTRACT

A display apparatus includes: a display panel; a data driver which applies a first data voltage to a first display area of the display panel during a first frame and applies a second data voltage to a second display area of the display panel during a second frame; and an emission driver which controls an emission of light on the first display area based on the first data voltage during the second frame and an emission of light on the second display area based on the second data voltage during a third frame. An area of a first visual image recognized to a user due to the emission of the light on the first display area is partially overlapped with an area of a second visual image recognized to the user due to the emission of the light on the second display area in a plan view.

17 Claims, 18 Drawing Sheets

(52) U.S. Cl.
CPC ............... *G09G 2300/046* (2013.01); *G09G 2310/0289* (2013.01); *G09G 2360/16* (2013.01)

(58) Field of Classification Search
CPC ....... G09G 2310/0289; G09G 2310/08; G09G 2320/0209; G09G 2340/0435; G09G 2360/16; G02B 27/017–0179; G02B 27/0955–0961; G02B 27/1066; G02B 30/24; H04N 13/139; H04N 13/156–167; H04N 13/332–354; G06T 3/4038
See application file for complete search history.

(56) References Cited

U.S. PATENT DOCUMENTS

| | | | |
|---|---|---|---|
| 2008/0316606 A1* | 12/2008 | Inoguchi | G02B 27/1066 359/636 |
| 2012/0293496 A1* | 11/2012 | Park | G09G 3/3233 345/212 |
| 2012/0306840 A1* | 12/2012 | Han | G09G 3/003 345/82 |
| 2013/0187836 A1* | 7/2013 | Cheng | G02B 5/04 345/8 |
| 2014/0062978 A1* | 3/2014 | Shin | G09G 3/3291 345/204 |
| 2018/0003999 A1 | 1/2018 | Minano et al. | |
| 2020/0204789 A1* | 6/2020 | Miñano | G02B 3/0006 |

\* cited by examiner

D3 ←

DISPLAY APPARATUS FOR GENERATING COMMON PART IN DIFFERENT DISPLAY AREAS, HEAD MOUNTED DISPLAY SYSTEM HAVING THE SAME AND METHOD OF DRIVING THE DISPLAY APPARATUS

This application claims priority to Korean Patent Application No. 10-2021-0016460, filed on Feb. 5, 2021, and all the benefits accruing therefrom under 35 U.S.C. § 119, the content of which in its entirety is herein incorporated by reference.

BACKGROUND

1. Field

Embodiments of the present inventive concept relate to a display apparatus, a head mounted display system including the display apparatus and a method of driving the display apparatus. More particularly, embodiments of the present inventive concept relate to a display apparatus capable of allowing an image to be recognized to a user at a high frequency even when the image is displayed at a low frequency on a display panel in a head mounted display system including a multi-channel lens, a head mounted display system including the display apparatus and a method of driving the display apparatus.

2. Description of the Related Art

As consumers' demand for virtual reality increases, many manufacturers have been developing a display system which enables a user to experience the virtual reality (e.g., a head mounted display ("HMD") system, a virtual reality ("VR") display system, etc.). Generally, the viewer wears a glasses-like display system and watches an image displayed by a display device included in the glasses-like display system to experience the virtual reality.

In the display system supporting the virtual reality, an increase of a driving frequency and an increase of a resolution have been required to enhance a display quality. However, when the driving frequency increases, one frame period is shortened, and when the resolution increases, one horizontal period is shortened, so that a voltage may not be sufficiently charged to a pixel of a display panel. When the voltage is not sufficiently charged to the pixel of the display panel, the display panel may not display a desired luminance.

In addition, when the driving frequency and the resolution increase, an amount of transmitted data may increase, and accordingly a load of a display panel driver may increase. Furthermore, when the driving frequency and the resolution increase, an operating cycle of the display panel driver may be shortened so that a heat generating and a power consumption may increase.

SUMMARY

Embodiments of the present inventive concept provide a display apparatus capable of allowing an image to be recognized to a user at a high frequency even when the image is displa
yed at a low frequency on a display panel in a head mounted display system including a multi-channel lens.

Embodiments of the present inventive concept also provide a head mounted display system including the above-mentioned display apparatus.

Embodiments of the present inventive concept also provide a method of driving the above-mentioned display apparatus.

In an embodiment of a display apparatus according to the present inventive concept, the display apparatus includes a display panel, a data driver and an emission driver. The data driver is configured to apply a first data voltage to a first display area of the display panel during a first frame and to apply a second data voltage to a second display area of the display panel during a second frame. The emission driver which controls an emission of light on the first display area based on the first data voltage during the second frame and an emission of light on the second display area based on the second data voltage during a third frame. An area of a first visual image recognized to a user due to the emission of the light on the first display area is partially overlapped with an area of a second visual image recognized to the user due to the emission of the light on the second display area in a plan view.

In an embodiment, the first display area and the area of the first visual image may be different from each other in the plan view. The second display area and the area of the second visual image may be different from each other in the plan view.

In an embodiment, the first display area may be not overlapped with the second display area in the plan view.

In an embodiment, the display panel may be divided into four areas. The four areas may include a first quadrant area, a second quadrant area, a third quadrant area and a fourth quadrant area.

In an embodiment, the first display area may include the first quadrant area and the third quadrant area. The second display area may include the second quadrant area and the fourth quadrant area.

In an embodiment, the first quadrant area may include a first main area adjacent to a corner area of the display panel and a first sub area adjacent to a center point of the display panel. An image displayed in the first main area may be disposed in a first quadrant area in the first visual image. An image displayed in the first sub area may be disposed out of the first quadrant area in the first visual image.

In an embodiment, a common visual image area in which the area of the first visual image and the area of the second visual image may be overlapped with each other has a cross shape along a horizontal central line of the display panel and a vertical central line of a combined visual image, and the combined visual image is an visual image recognized to the user by combining the first visual image and the second visual image.

In an embodiment, the first display area may include the first quadrant area and the second quadrant area. The second display area may include the third quadrant area and the fourth quadrant area.

In an embodiment, the first quadrant area may include a first main area adjacent to a corner area of the display panel and a first sub area adjacent to a center point of the display panel. An image displayed in the first main area may be disposed in a first quadrant area in the first visual image. An image displayed in the first sub area may be disposed out of the first quadrant area in the first visual image.

In an embodiment, a common visual image area in which the area of the first visual image and the area of the second visual image may be overlapped with each other extends along a horizontal central line of a combined visual image, and the combined visual image is an visual image recognized to the user by combining the first visual image and the second visual image.

In an embodiment, the display panel may be divided into two areas. The two areas may include an upper area and a lower area.

In an embodiment, the first display area may include the upper area. The second display area may include the lower area.

In an embodiment, the upper area may include a first main area adjacent to a first corner area of the display panel, a second main area adjacent to a second corner area of the display panel and a first sub area including a vertical portion disposed between the first main area and the second main area and a horizontal portion adjacent to a horizontal central line of the display panel. An image displayed in the first main area and an image displayed in the second main area may be disposed in an upper area in the first visual image. An image displayed in the horizontal portion of the first sub area may be disposed out of the upper area in the first visual image.

In an embodiment, a common visual image area in which the area of the first visual image and the area of the second visual image may be overlapped with each other extends along a horizontal central line of a combined visual image, and the combined visual image is an visual image recognized to the user by combining the first visual image and the second visual image.

In an embodiment, the display panel may be divided into eight areas. The display panel may include first to eighth divided areas which are sequentially rotated around a center point of the display panel.

In an embodiment, the first display area may include the first, third, fifth and seventh divided areas having vertices which meet at the center point of the display panel. The second display area may include the second, fourth, sixth and eighth divided areas having vertices which meet at the center point of the display panel.

In an embodiment, the first divided area may include a first main area and a first sub area. The first sub area may be disposed closer to the center point and adjacent divided areas of the display panel compared to the first main area. An image displayed in the first main area may be disposed in a first divided area in the first visual image when the first visual image is divided corresponding to the divided areas of the first display area. An image displayed in the first sub area may be disposed out of the first divided area in the first visual image when the first visual image is divided corresponding to the divided areas of the first display area.

In an embodiment of a head mounted display system according to the present inventive concept, the head mounted display system includes a display apparatus and a multi-channel optical system. The display apparatus includes a display panel. The multi-channel optical system is configured to refract and reflect light and to transmit the light to a user's eye. An area of a first visual image recognized to the user due to an emission of light on a first display area of the display panel is partially overlapped with an area of a second visual image recognized to the user due to an emission of light on a second display area of the display panel. The first display area is not overlapped with the second display area in a plan view.

In an embodiment, the display apparatus may further include a data driver which applies a first data voltage to the first display area of the display panel during a first frame and applies a second data voltage to the second display area of the display panel during a second frame and an emission driver which controls the emission of the light on the first display area based on the first data voltage during the second frame and the emission of the light on the second display area based on the second data voltage during a third frame.

In an embodiment, the multi-channel optical system may be configured to transmit a light emitted from the display panel to the user's eye through two refractions and two reflections.

In an embodiment of a method of driving a display apparatus according to the present inventive concept, the method includes applying a first data voltage to a first display area of a display panel during a first frame, applying a second data voltage to a second display area of the display panel during a second frame, emitting light on the first display area based on the first data voltage during the second frame and emitting light on the second display area based on the second data voltage during a third frame. An area of a first visual image recognized to a user due to an emission of the light on the first display area is partially overlapped with an area of a second visual image recognized to the user due to an emission of the light on the second display area.

According to the display apparatus, the head mounted display system including the display apparatus, the method of driving the display apparatus, the head mounted display system includes the multi-channel lens. An image area displayed on the display panel and an image area recognized to user's eyes may be formed differently by the multi-channel lens.

The image may be recognized to a user at a high frequency even when the image is displayed at a low frequency on the display panel in the head mounted display system including the multi-channel lens.

The driving frequency may be set to be relatively low so that the problem that the display luminance is lower than the desired luminance due to insufficient charging of the voltage in the pixels of the display panel may be solved.

In addition, the driving frequency may be set to be relatively low so that the increase of the load of the display panel driver due to the increase of the amount of the transmitted data may be effectively prevented and the increase of the heat generating and the increase of the power consumption due to the shortened operating cycle of the display panel driver may be effectively prevented.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Hereinafter, the present inventive concept will be explained in detail with reference to the accompanying drawings.

Figure 1:
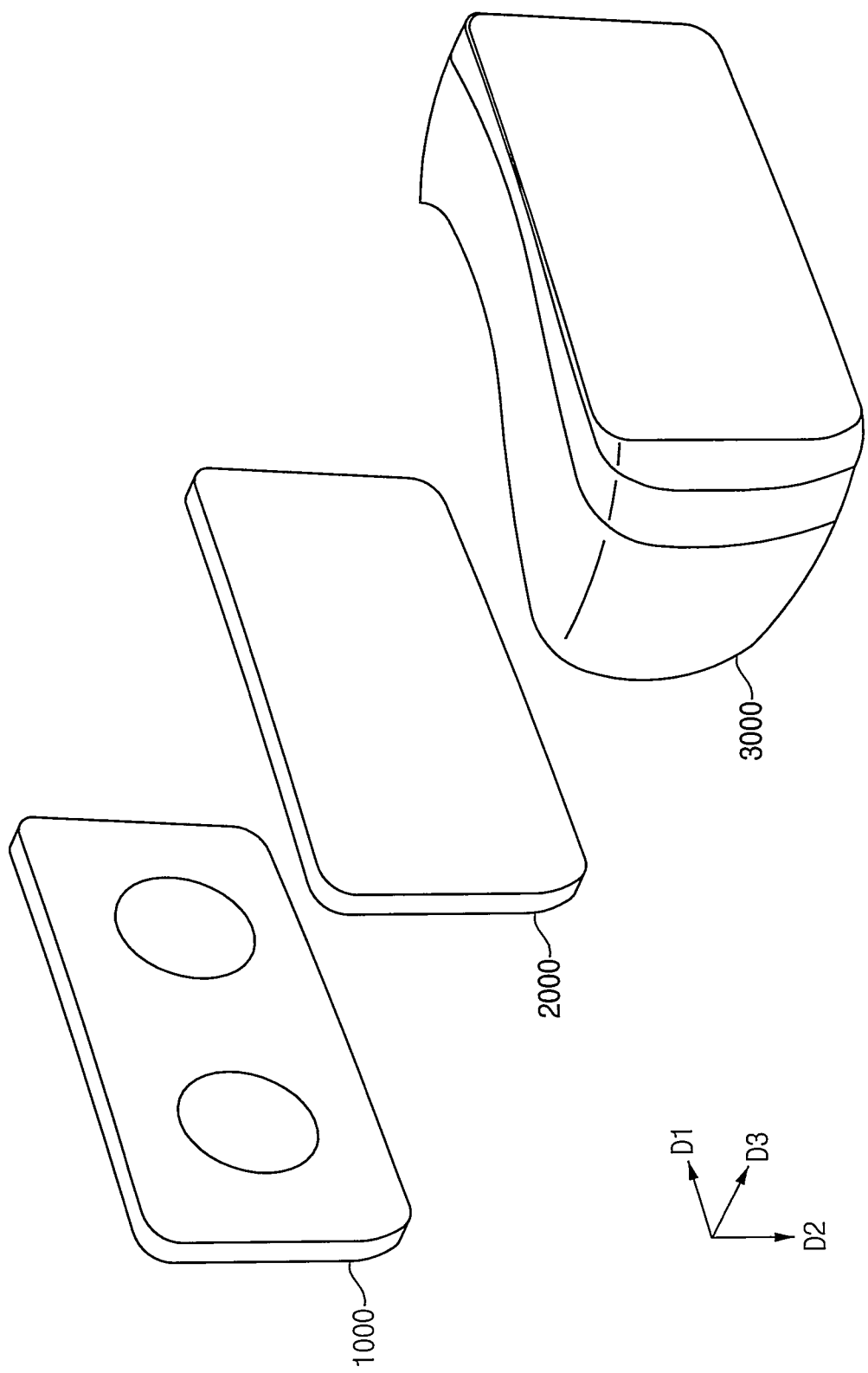
FIG. 1 is a perspective view illustrating a head mounted display system according to an embodiment of the present inventive concept.

FIG. 1 is a perspective view illustrating a head mounted display system according to an embodiment of the present inventive concept.

Referring to FIG. 1, the head mounted display system includes a lens unit 1000, a display apparatus 2000 and a housing 3000. The display apparatus 2000 is disposed adjacent to the lens unit 1000. The housing 3000 may receive the lens unit 1000 and the display apparatus 2000. Although the lens unit 1000 and the display apparatus 2000 are accommodated in a first side of the housing 3000 in FIG. 1, the present inventive concept may not be limited thereto. Alternatively, the lens unit 1000 may be accommodated in a first side of the housing 3000, and the display apparatus 2000 may be accommodated in a second side of the housing 3000 opposite to the first side of the housing 3000. When the lens unit 1000 and the display apparatus 2000 are accommodated in the housing 3000 in opposite sides, respectively, the housing 3000 may have a transmission area to transmit a light.

In an embodiment, for example, the head mounted display system may be a head mounted display system which is wearable on a head of a user. Although not shown in figures, the head mounted display system may further include a head band to fix the head mounted display system on the head of the user.

Figure 2:
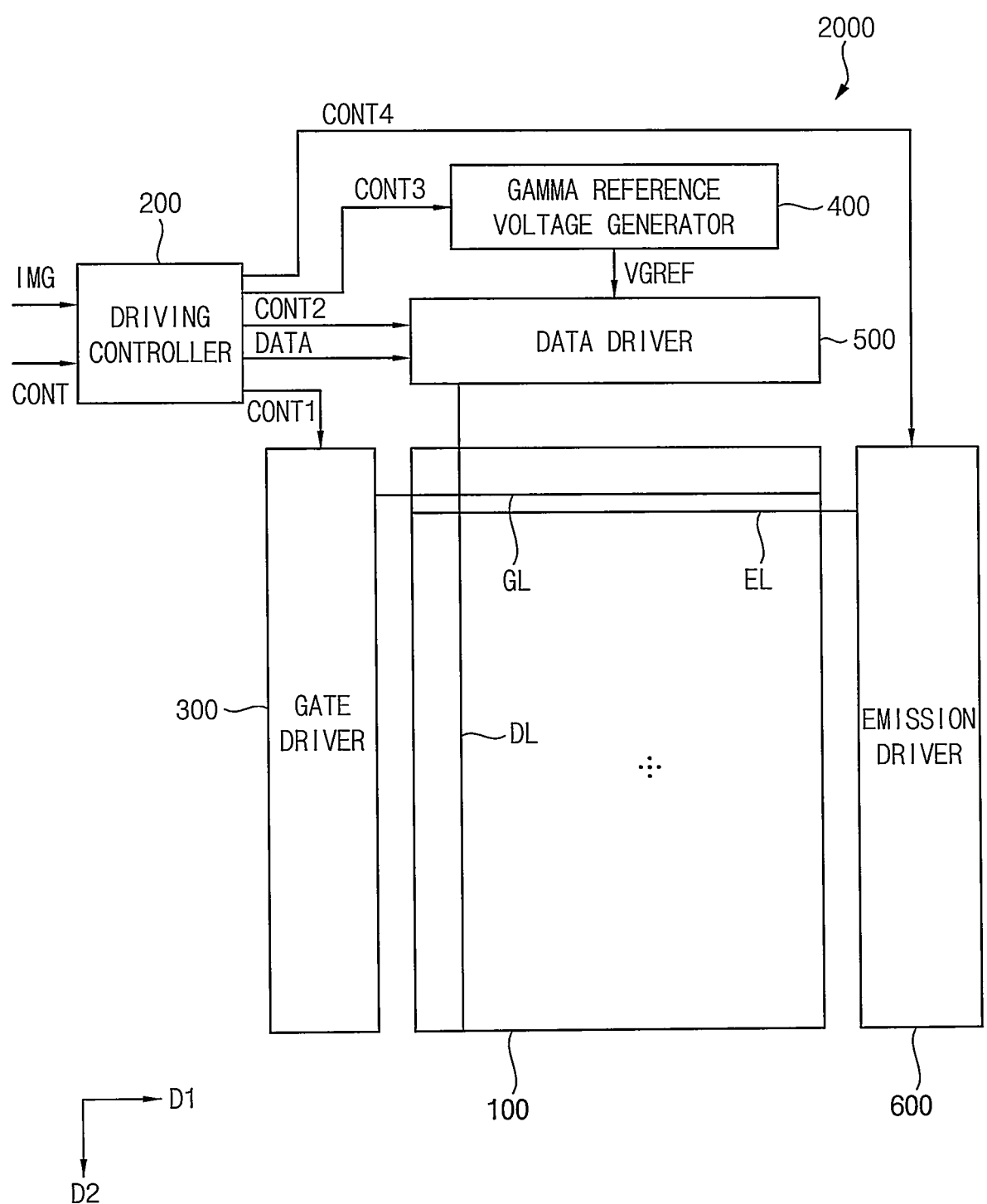
FIG. 2 is a block diagram illustrating a display apparatus of FIG. 1.

FIG. 2 is a block diagram illustrating the display apparatus of FIG. 1.

Referring to FIGS. 1 and 2, the display apparatus 2000 includes a display panel 100 and a display panel driver. The display panel driver includes a driving controller 200, a gate driver 300, a gamma reference voltage generator 400, a data driver 500 and an emission driver 600.

In an embodiment, for example, the driving controller 200 and the data driver 500 may be integrally formed. For example, the driving controller 200, the gamma reference voltage generator 400 and the data driver 500 may be integrally formed. For example, the driving controller 200, the gate driver 300, the gamma reference voltage generator 400 and the data driver 500 may be integrally formed. For example, the driving controller 200, the gate driver 300, the gamma reference voltage generator 400, the data driver 500 and the emission driver 600 may be integrally formed.

The display panel 100 includes a plurality of gate lines GL, a plurality of data lines DL, a plurality of emission lines EL and a plurality of pixels electrically connected to the gate lines GL, the data lines DL and the emission lines EL. The gate lines GL extend in a first direction D1, the data lines DL extend in a second direction D2 crossing the first direction D1, and the emission lines EL extend in the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GL in response to the first control signal CONT1 received from the driving controller 200. The gate driver 300 may output the gate signals to the gate lines GL. For example, the gate driver 300 may be integrated on the display panel 100. For example, the gate driver 300 may be mounted on the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL. For example, the emission driver 600 may be integrated on the display panel 100. For example, the emission driver 600 may be mounted on the display panel 100. Although the gate driver 300 is disposed in a first side of the pixels of the display panel 100 and applies the gate signal to the pixels and the emission driver 600 is disposed in a second side of the pixels of the display panel 100 and applies the emission signal to the pixels in FIG. 2 for convenience of explanation, the present inventive concept may not be limited thereto. Alternatively, the gate driver 300 and the emission driver 600 may be disposed in the first side of the pixels of the display panel 100 and apply the gate signal and the emission signal to the pixels. Alternatively, the gate drivers 300 and the emission drivers 600 may be disposed in the first and second sides of the pixels of the display panel 100 and apply the gate signal and the emission signal to the pixels.

Figure 3:
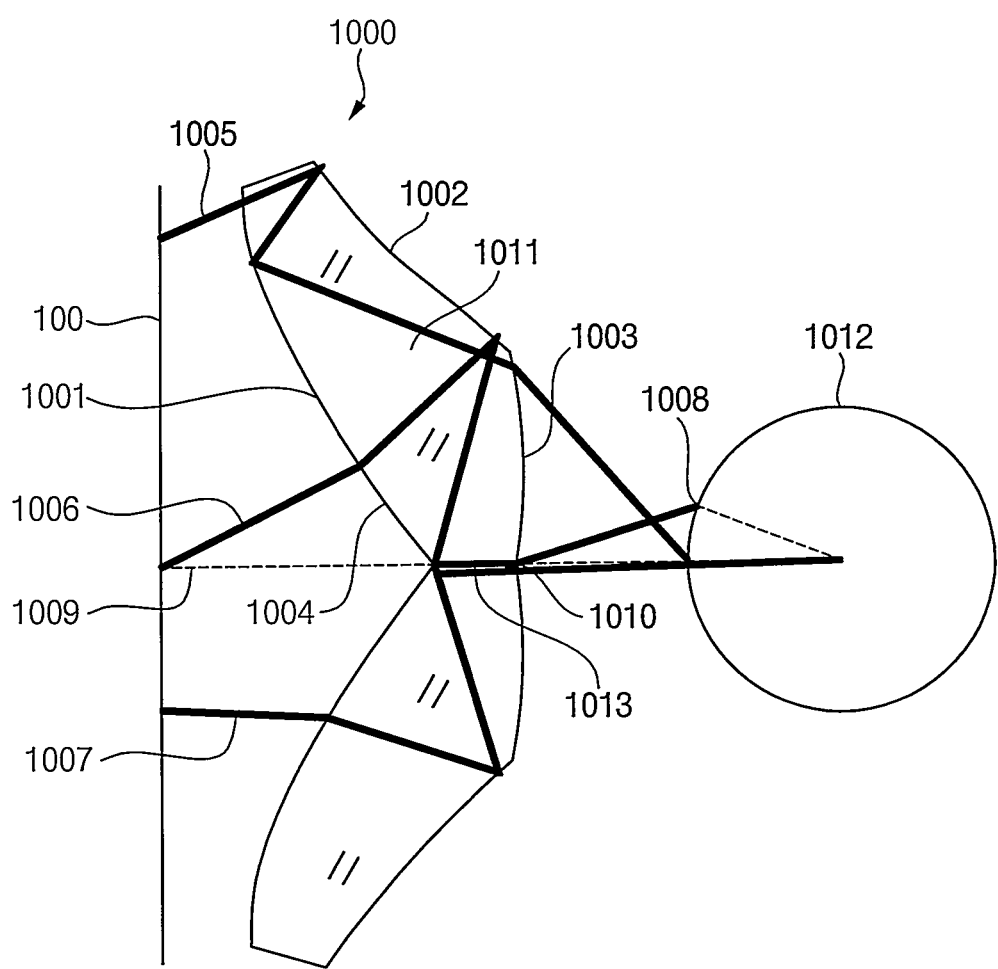
FIG. 3 is a cross-sectional view illustrating a lens of FIG. 1.
Figure 4:
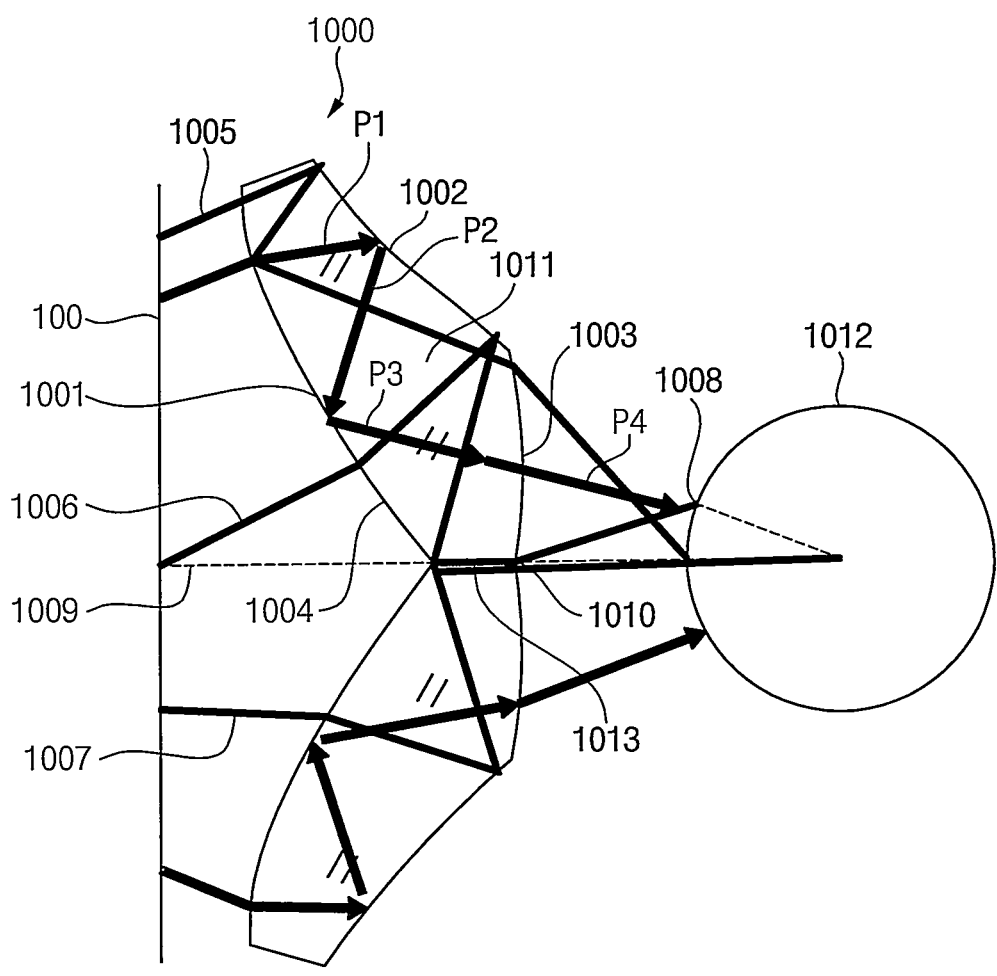
FIG. 4 is a conceptual diagram illustrating a path of light in the lens of FIG. 1.

FIG. 3 is a cross-sectional view illustrating the lens unit 1000 of FIG. 1. FIG. 4 is a conceptual diagram illustrating a path of light in the lens unit 1000 of FIG. 1.

Although one user's eye and one unit lens (one lenslet) corresponding to the user's eye are illustrated in FIGS. 3 and 4 for convenience of explanation, the lens unit 1000 may include two unit lenses (two lenslets) corresponding to both eyes of the user.

Referring to FIGS. 1 to 4, the lens unit 1000 may be a multi-channel lens (a multi-channel optical system). The image displayed on the display panel 100 may be transmitted to the user's eye through the lens unit 1000. As used herein, the image displayed on the display panel 100 is referred to a display image, and the image recognized (or perceived) to the user's eye is referred to a "visual image". The lens unit 1000 is the multi-channel lens so that an area of the display image may be different from an area of the visual image in a plan view. As used here, the "plan view" is a view in a third direction D3 perpendicular to the major surface plane of the display panel 100 which is defined by the first direction D1 and the second direction D2. The third direction D3 is parallel to an optical axis 1009 (See FIG. 3). For example, when the display panel 100 (or the area of the display image) and the area of the visual image are divided in the same manner, areas corresponding to each other may be different from each other. For example, when the display panel 100 is divided into four equal parts (four quadrants) by dividing two equal parts in a horizontal direction and dividing two equal parts in a vertical direction, and when an image is displayed in a first quadrant area of the display panel 100, the visual image may not be disposed as it is in the first quadrant area. A portion of the display image displayed in the first quadrant area of the display panel 100 may be disposed out of the first quadrant area in the visual image. In contrast, a portion of the display image displayed out of the first quadrant area of the display panel 100 may be disposed in the first quadrant area in the visual image in the plan view.

As shown in FIG. 3, the lens unit 1000 may have a form of a two-fold lens having a cusp 1010 on an exit surface 1003. Thus, the lens unit 1000 may have two exit surfaces, one for each lenslet. Accordingly, the two lenslets may be manufactured independently and the two lenslets may be operated without optical crosstalk from each other. The above design principle may be applied to a k-fold lens as well as the two-fold lens. Herein, k is an integer greater than one. FIG. 3 is a horizontal cross-section of the lens unit 1000. FIG. 3 illustrates a position of the user's eye 1012. The lens unit 1000 may include two pieces meeting along a surface 1013.

The display panel 100 may be disposed corresponding to the above 2-fold configuration. Rays 1005 and 1006 undergo a refraction on an incident surface 1001, then reflection on a mirrored surface 1002, total internal reflection in case of the ray 1005 or reflection in case of the ray 1006 on a metalized portion of the incident surface 1001, and finally refraction on a surface 1003 to be directed towards the eye 1012 (similarly for a ray 1007). Surfaces 1001, 1002 and 1003 may be freeform. A characteristic of a design of the lens unit 1000 may appear on the exit surface 1003 at the point of the trajectory of the ray 1006 that defines a pupil range, since optical cross-talk needs to be avoided. The ray 1006 comes from a cluster edge on the display panel 100, and after refraction on the inner border of the refracting portion of the incident surface 1001 and after reflections on edges of surfaces 1002 and 1004, it is reflected parallel to an optical axis 1009, refracted on the cusp edge of the exit surface 1003 and directed towards the pupil range edge labeled as 1008.

As shown in FIG. 4, the lens unit 1000 is a multi-channel lens and the display image displayed on the display panel 100 is transmitted to the user's eye through two refractions (indicated by P1 and P4) and two reflections (indicated by P2 and P3) within the lens unit 1000.

Figure 5:
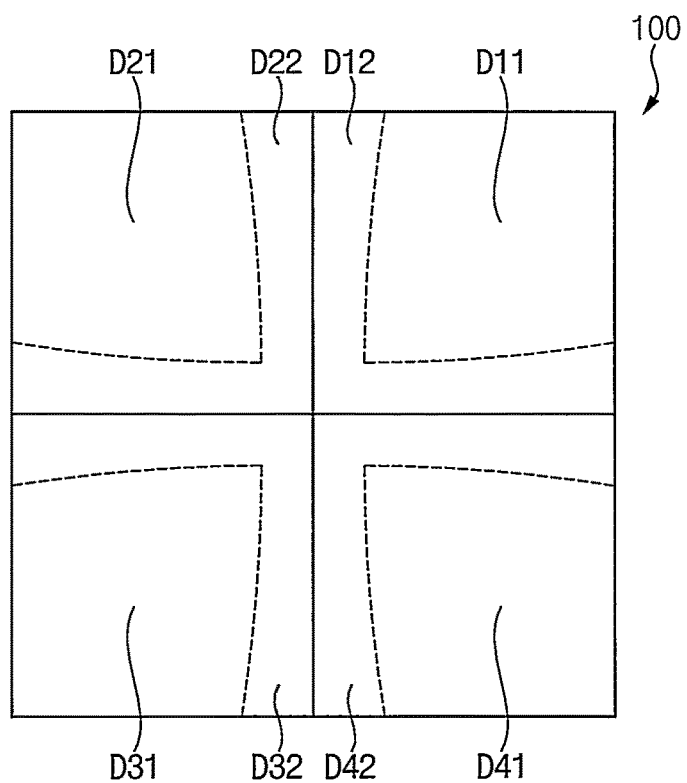
FIG. 5 is a conceptual diagram illustrating a display area of a display panel of FIG. 2.
Figure 6:
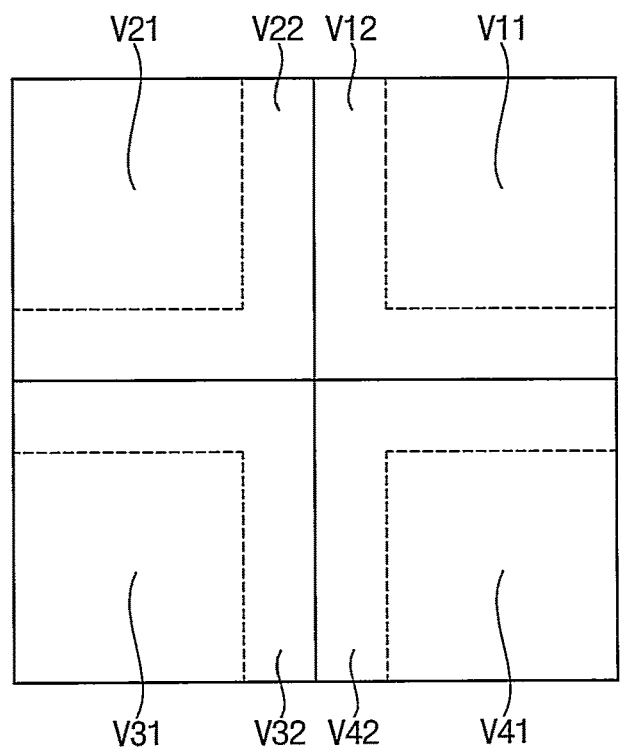
FIG. 6 is a conceptual diagram illustrating a visual area where an image displayed in the display area of FIG. 5 is recognized by a user's vision through the lens of FIG. 1.
Figure 7:
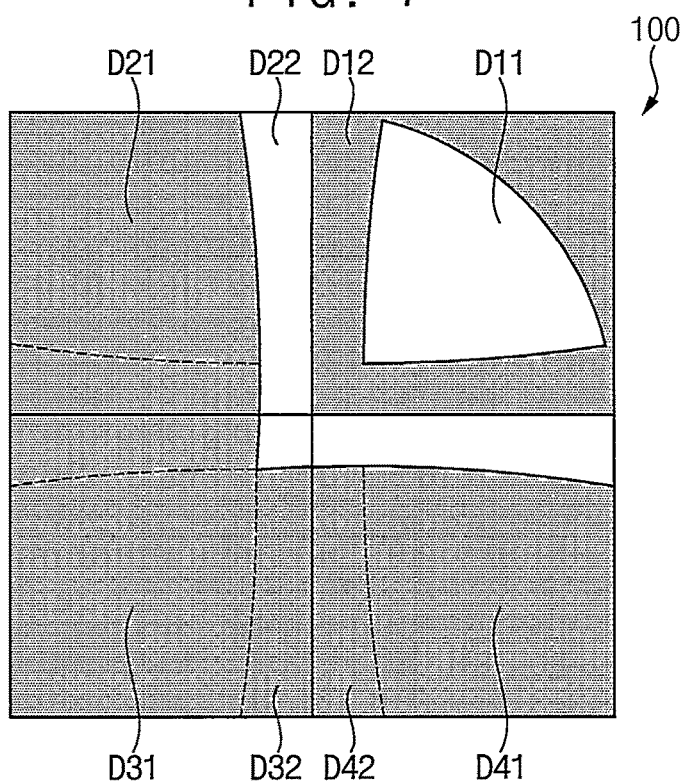
FIG. 7 is a conceptual diagram illustrating an example of a display image displayed in the display area of FIG. 5.
Figure 8:
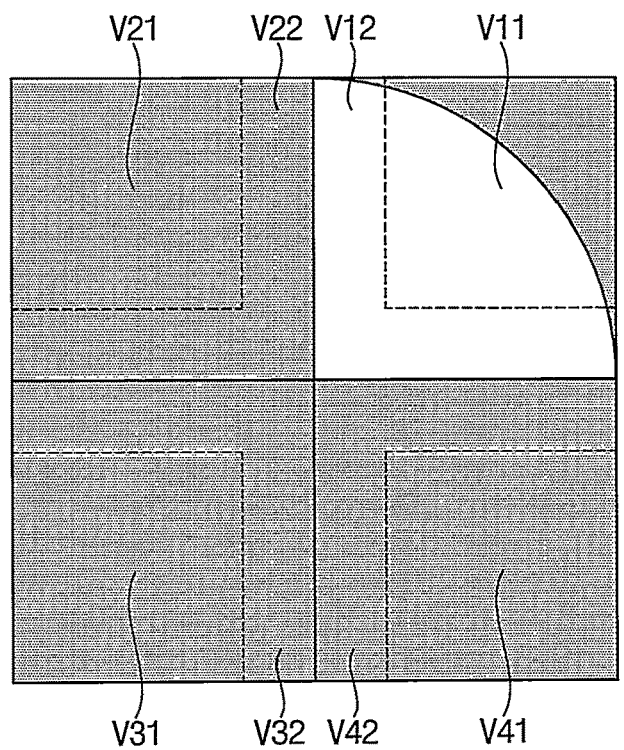
FIG. 8 is a conceptual diagram illustrating an example of a visual image which is the display image of FIG. 7 recognized by the user's vision through the lens of FIG. 1.

FIG. 5 is a conceptual diagram illustrating the display area of the display panel 100 of FIG. 2. FIG. 6 is a conceptual diagram illustrating a visual area where an image displayed in the display area of FIG. 5 is recognized (or perceived) by the user's vision through the lens unit 1000 of FIG. 1. FIG. 7 is a conceptual diagram illustrating an example of the display image displayed in the display area of FIG. 5. FIG. 8 is a conceptual diagram illustrating an example of the visual image which is the display image of FIG. 7 recognized (or perceived) by the user's vision through the lens unit 1000 of FIG. 1.

Referring to FIGS. 1 to 8, the display panel 100 may be divided into four quadrants and the display panel 100 may include a first quadrant area D11 and D12, a second quadrant area D21 and D22, a third quadrant area D31 and D32 and a fourth quadrant area D41 and D42. The display panel 100 may be divided into four areas along a horizontal central line of the display panel 100 and a vertical central line of the display panel 100.

The first quadrant area D11 and D12 may include a first main area D11 adjacent to a corner area of the display panel 100 and a first sub area D12 adjacent to a center point of the display panel 100.

The image displayed in the first main area D11 may be disposed in the first quadrant area in the visual image recognized to the user's eye. However, the image displayed in the first sub area D12 may be disposed out of the first quadrant area in the visual image.

The second quadrant area D21 and D22 may include a second main area D21 adjacent to another corner area of the display panel 100 and a second sub area D22 adjacent to the center point of the display panel 100.

The image displayed in the second main area D21 may be disposed in the second quadrant area in the visual image recognized to the user's eye. However, the image displayed in the second sub area D22 may be disposed out of the second quadrant area in the visual image.

The third quadrant area D31 and D32 may include a third main area D31 adjacent to still another corner area of the display panel 100 and a third sub area D32 adjacent to the center point of the display panel 100.

The image displayed in the third main area D31 may be disposed in the third quadrant area in the visual image recognized to the user's eye. However, the image displayed in the third sub area D32 may be disposed out of the third quadrant area in the visual image.

The fourth quadrant area D41 and D42 may include a fourth main area D41 adjacent to yet another corner area of the display panel 100 and a fourth sub area D42 adjacent to the center point of the display panel 100.

The image displayed in the fourth main area D41 may be disposed in the fourth quadrant area in the visual image recognized to the user's eye. However, the image displayed in the fourth sub area D42 may be disposed out of the fourth quadrant area in the visual image.

The visual image which is recognized to the user's eyes and corresponds to the image displayed on the display panel 100 may also be divided into four areas. The visual image may include a first quadrant area V11 and V12, a second quadrant area V21 and V22, a third quadrant area V31 and V32 and a fourth quadrant area V41 and V42. The visual image may be divided in the same manner as the method in which the display panel 100 is divided into four areas.

The first quadrant area V11 and V12 of the visual image may include a first main area V11 adjacent to the corner area of the visual image and a first sub area V12 adjacent to the center point of the visual image.

The second quadrant area V21 and V22 of the visual image may include a second main area V21 adjacent to another corner area of the visual image and a second sub area V22 adjacent to the center point of the visual image.

The third quadrant area V31 and V32 of the visual image may include a third main area V31 adjacent to still another corner area of the visual image and a third sub area V32 adjacent to the center point of the visual image.

The fourth quadrant area V41 and V42 of the visual image may include a fourth main area V41 adjacent to yet another corner area of the visual image and a fourth sub area V42 adjacent to the center point of the visual image.

A portion represented in white in FIG. 7 means a portion on which the image is displayed in the display panel 100. A portion represented in white in FIG. 8 means a portion where the image is recognized by the user's vision.

As shown in FIG. 7, an image is displayed in the first main area D11 of the display panel 100 and no image is displayed in the first sub area D12 of the display panel D12 and an image is displayed in portions surrounding the first sub area D12 among the second sub area D22, the third sub area D32 and the fourth sub area D42.

As shown in FIG. 8, the user may recognize the image of FIG. 7 only in the first quadrant of the visual image. The display image in the first main area D11 may be recognized to the user in the first quadrant area V11 and V12. In addition, the image in the portions surrounding the first sub area D12 among the second sub area D22, the third sub area D32 and the fourth sub area D42 may not be recognized to the user in the second quadrant, the third quadrant and the fourth quadrant of the visual image but may be the recognized to the user in the first quadrant area V11 and V12 in the user's visual image.

Figure 9:
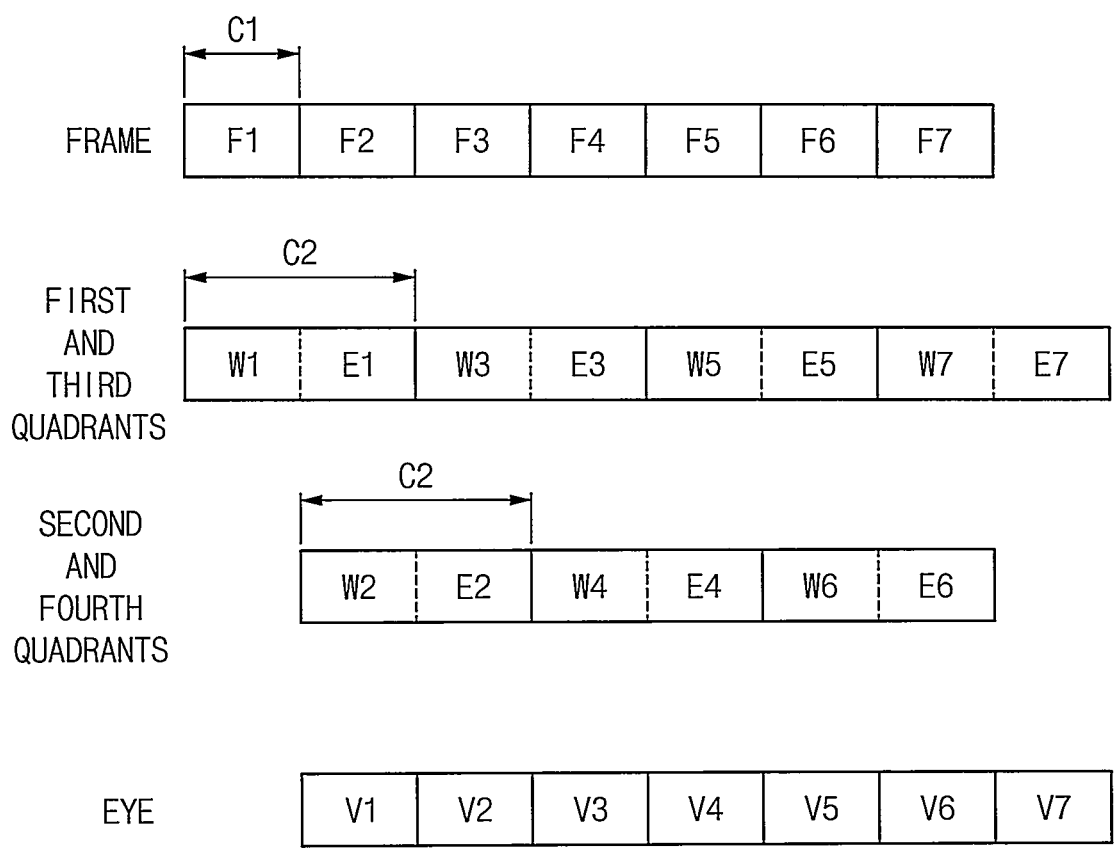
FIG. 9 is a timing diagram illustrating a sequence of displaying an image in the display area of FIG. 5.
Figure 10:
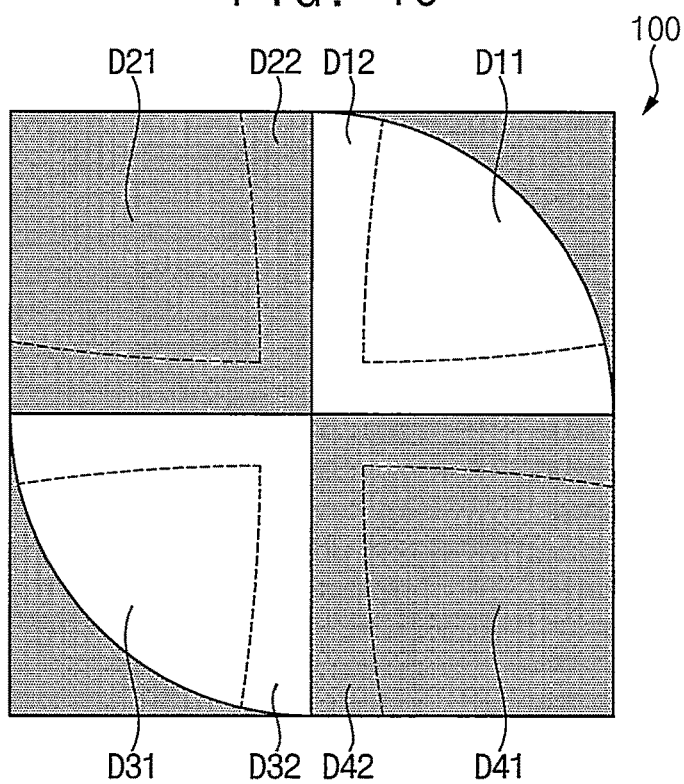
FIG. 10 is a conceptual diagram illustrating a first display image displayed in a first quadrant and a third quadrant of the display area of FIG. 5.
Figure 11:
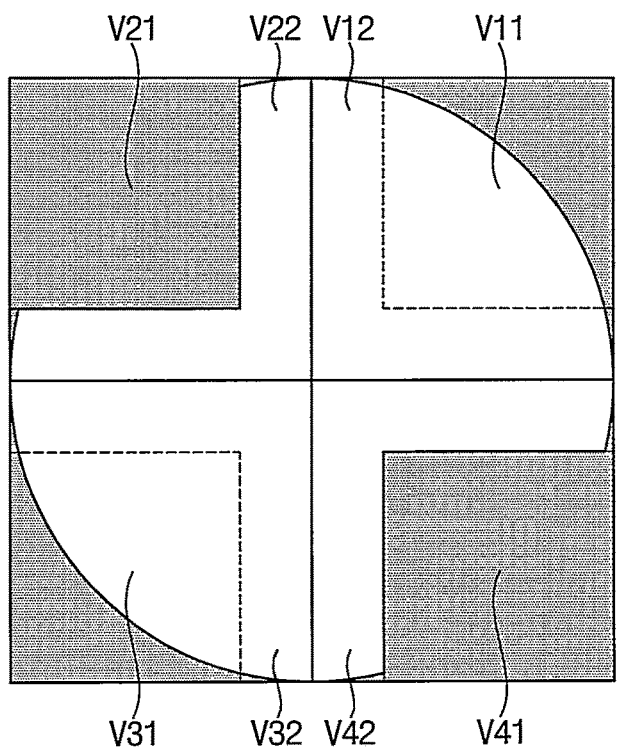
FIG. 11 is a conceptual diagram illustrating a first visual image which is the first display image of FIG. 10 recognized by the user's vision through the lens of FIG. 1.
Figure 12:
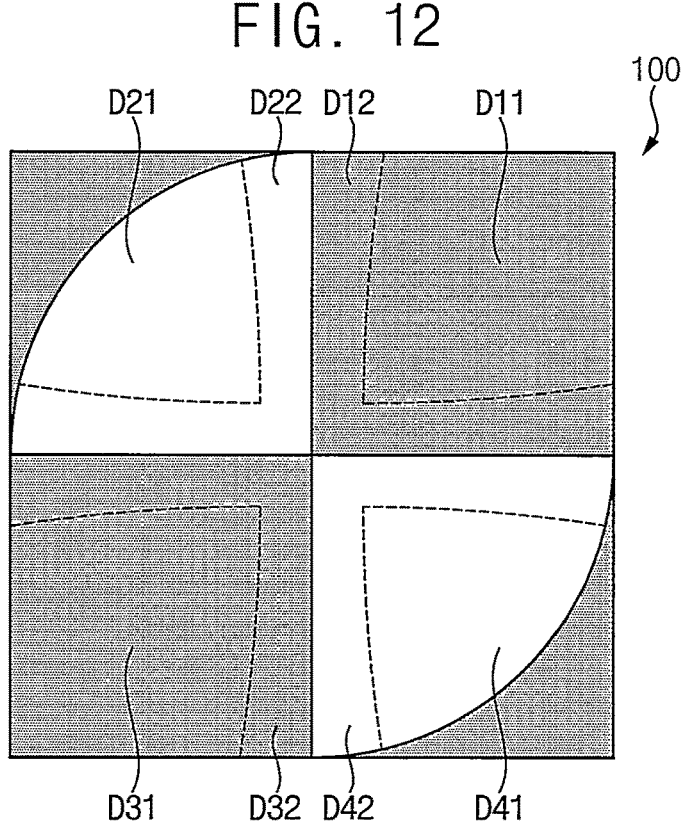
FIG. 12 is a conceptual diagram illustrating a second display image displayed in a second quadrant and a fourth quadrant of the display area of FIG. 5.
Figure 13:
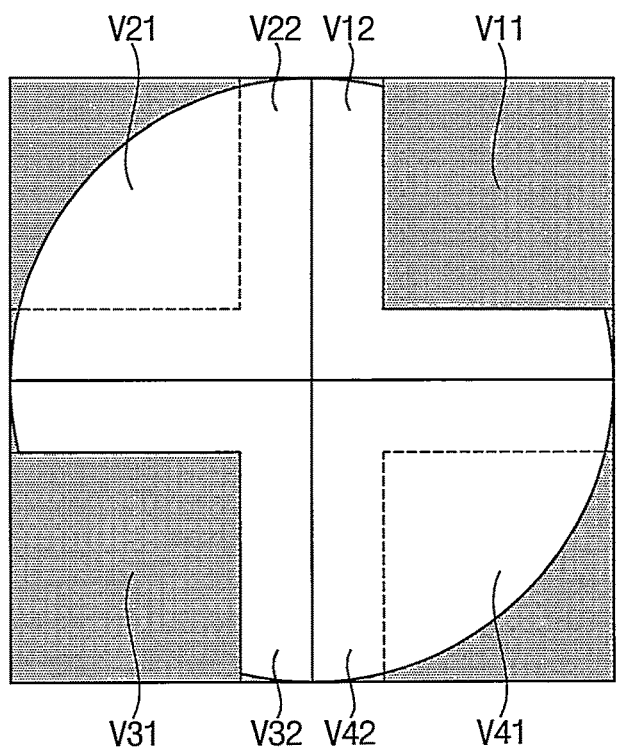
FIG. 13 is a conceptual diagram illustrating a second visual image which is the second display image of FIG. 12 recognized by the user's vision through the lens of FIG. 1.
Figure 14:
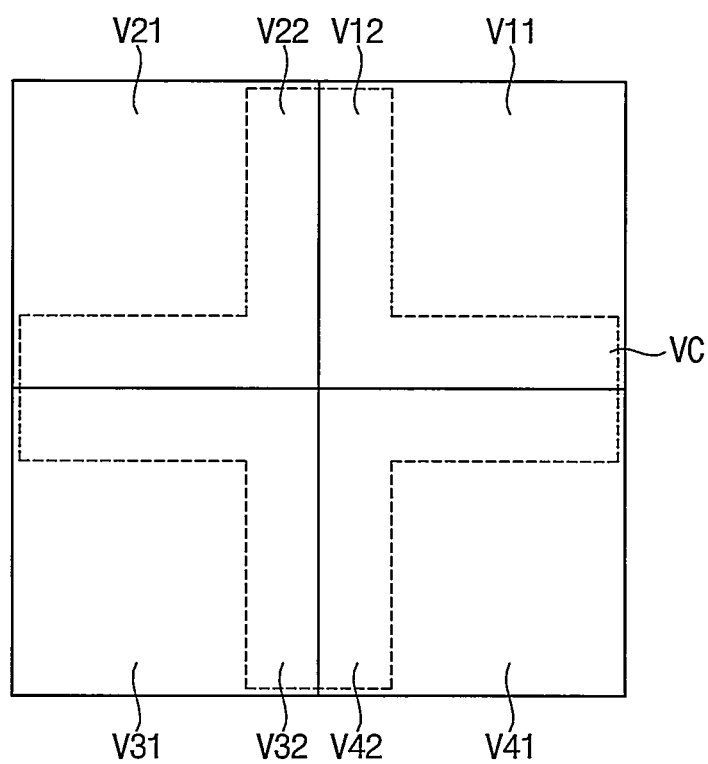
FIG. 14 is a conceptual diagram illustrating a common visual image area in which an area of the first visual image of FIG. 11 and an area of the second visual image of FIG. 12 are overlapped with each other.

FIG. 9 is a timing diagram illustrating a sequence of displaying an image in the display area of FIG. 5. FIG. 10 is a conceptual diagram illustrating a first display image displayed in a first quadrant and a third quadrant of the display area of FIG. 5. FIG. 11 is a conceptual diagram illustrating a first visual image which is the first display image of FIG. 10 recognized by the user's vision through the lens unit 1000 of FIG. 1. FIG. 12 is a conceptual diagram illustrating a second display image displayed in a second quadrant and a fourth quadrant of the display area of FIG. 5. FIG. 13 is a conceptual diagram illustrating a second visual image which is the second display image of FIG. 12 recognized by the user's vision through the lens unit 1000 of FIG. 1. FIG. 14 is a conceptual diagram illustrating a common visual image area in which an area of the first visual image of FIG. 11 and an area of the second visual image of FIG. 12 are overlapped with each other.

Referring to FIGS. 1 to 14, for example, when the input image data IMG are inputted in a frequency of 120 Hertz (Hz), the first display area of the display panel 100 is driven in a frequency of 60 Hz and the second display area of the display panel 100 is driven in a frequency of 60 Hz so that the user may recognize the image in a frequency of 120 Hz.

In another embodiment, for example, when the input image data IMG are inputted in a frequency of 60 Hz, the first display area of the display panel 100 is driven in a frequency of 30 Hz and the second display area of the display panel 100 is driven in a frequency of 30 Hz so that the user may recognize the image in a frequency of 60 Hz.

As shown in FIG. 9, during a first frame F1, the data driver 500 may apply a first data voltage (Step W1) to the first display area (e.g., the first quadrant area D11 and D12 and the third quadrant area D31 and D32). During a second frame F2, the data driver 500 may apply a second data voltage (Step W2) to the second display area (e.g., the second quadrant area D21 and D22 and the fourth quadrant area D41 and D42).

During the second frame F2, the emission driver 600 may control an emission of light on the first display area (e.g., the first quadrant area D11 and D12 and the third quadrant area D31 and D32) (Step E1) based on the first data voltage such that the first display area emits the light based on the first data voltage. During a third frame F3, the emission driver 600 may control an emission of light on the second display area (e.g., the second quadrant area D21 and D22 and the fourth quadrant area D41 and D42) (Step E2) based on the second data voltage such that the second display area emits the light based on the second data voltage.

In the same way, during the third frame F3, the data driver 500 may apply a first data voltage (Step W3) to the first display area (e.g., the first quadrant area D11 and D12 and the third quadrant area D31 and D32). During a fourth frame F4, the data driver 500 may apply a second data voltage (Step W4) to the second display area (e.g., the second quadrant area D21 and D22 and the fourth quadrant area D41 and D42).

During the fourth frame F4, the emission driver 600 may control an emission of light on the first display area (e.g., the first quadrant area D11 and D12 and the third quadrant area D31 and D32) (Step E3) based on the first data voltage such that the first display area emits the light based on the first data voltage. During a fifth frame F5, the emission driver 600 may control an emission of light on the second display area (e.g., the second quadrant area D21 and D22 and the fourth quadrant area D41 and D42) (Step E4) based on the second data voltage such that the second display area emits the light based on the second data voltage.

Herein, a first visual image V1 may be the image recognized to the user's eye due to the emission (E1) of the first display area during the second frame F2. A second visual image V2 may be the image recognized to the user's eye due to the emission (E2) of the second display area during the third frame F3. A third visual image V3 may be the image recognized to the user's eye due to the emission (E3) of the first display area during the fourth frame F4. A fourth visual image V4 may be the image recognized to the user's eye due to the emission (E3) of the second display area during the fifth frame F5.

According to the above explained method, the image may be recognized to the user at a high frequency by the multi-channel lens unit 1000 even when the image is displayed at a low frequency in each display area on the display panel 100. For example, an image displaying cycle C2 of the first display area (the first quadrant area D11 and D12 and the third quadrant area D31 and D32) and an image displaying cycle C2 of the second display area (the second quadrant area D21 and D22 and the fourth quadrant area D41 and D42) may be twice of a cycle C1 of the input image data IMG. In contrast, the frequency of the visual image V1 to V7 which is perceived to the user may be substantially same as an input frequency of the input image data IMG.

In the present embodiment, the first display area may include the first quadrant area D11 and D12 and the third quadrant area D31 and D32, and the second display area may include the second quadrant area D21 and D22 and the fourth quadrant area D41 and D42.

As shown in FIGS. 10 and 12, the first display area (e.g., the first quadrant area D11 and D12 and the third quadrant area D31 and D32) may not be overlapped with the second display area (e.g., the second quadrant area D21 and D22 and the fourth quadrant area D41 and D42) in the plan view.

In contrast, as shown in FIGS. 11 and 13, the area (FIG. 11) of the first visual image recognized to the user due to the emission of the first display area in FIG. 10 may be partially overlapped with the area (FIG. 13) of the second visual image recognized to the user due to the emission of the second display area in FIG. 12.

Herein, the first display area and the area of the first visual image may be different from each other in a plan view, and the second display area and the area of the second visual image may be different from each other in a plan view.

FIG. 14 represents the common visual image area VC in which the area of the first visual image and the area of the second visual image are overlapped with each other. In the present embodiment, as shown in FIG. 14, the common visual image area VC in which the area of the first visual image and the area of the second visual image are overlapped with each other may have a cross shape (illustrated as dot lines) along the horizontal central line of a combined visual image and the vertical central line of the combined visual image. Here, the combined visual image may be an visual image recognized to the user by combining the first visual image and the second visual image.

According to the present embodiment, the head mounted display system includes the multi-channel lens unit 1000. The image area displayed on the display panel 100 and the image area recognized to the user's eyes may be formed differently by the multi-channel lens unit 1000.

The image may be recognized to the user at a high frequency even when the image is displayed at a low frequency on each display area of the display panel 100 in the head mounted display system including the multi-channel lens unit 1000.

The driving frequency may be set to be relatively low so that the problem that the display luminance is lower than the desired luminance due to insufficient charging of the voltage in the pixels of the display panel 100 may be solved.

In addition, the driving frequency may be set to be relatively low so that the increase of the load of the display panel driver due to the increase of the amount of the transmitted data may be effectively prevented, and the increase of the heat generating and the increase of the power consumption due to the shortened operating cycle of the display panel driver may be effectively prevented.

Figure 15:
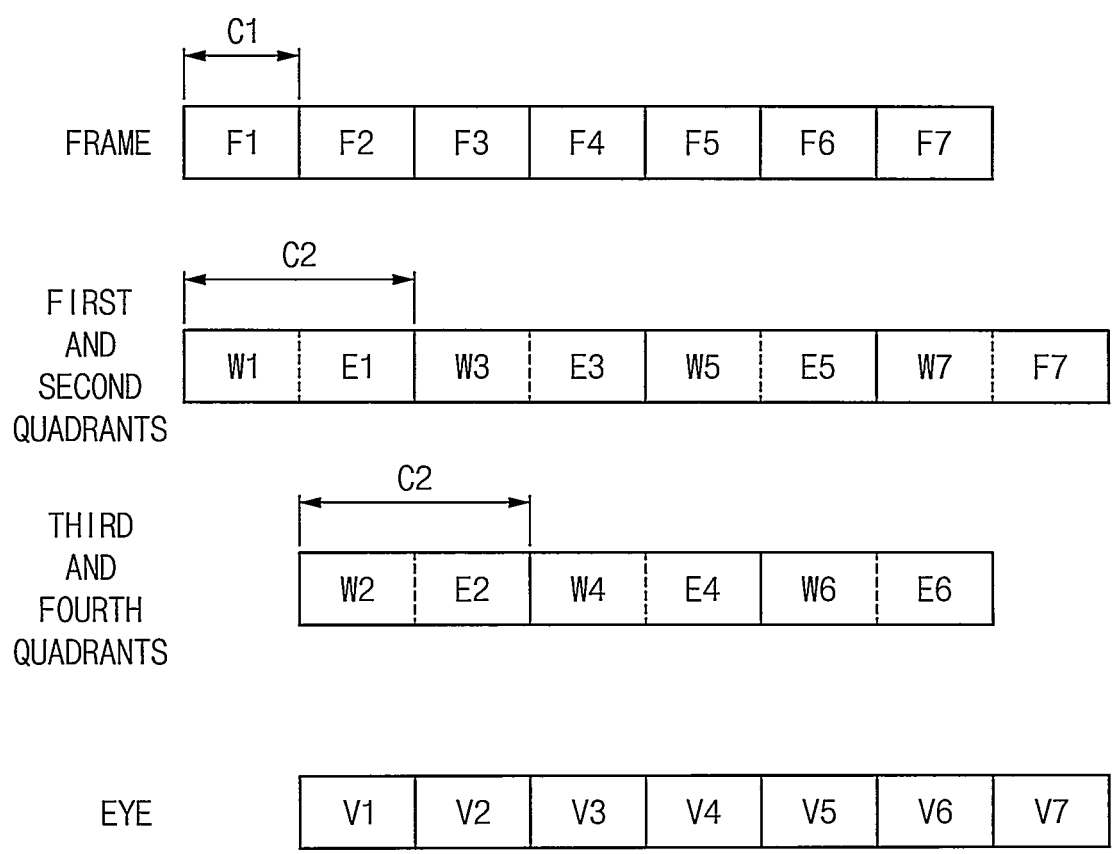
FIG. 15 is a timing diagram illustrating a sequence of displaying an image in the display area of FIG. 5.
Figure 16:
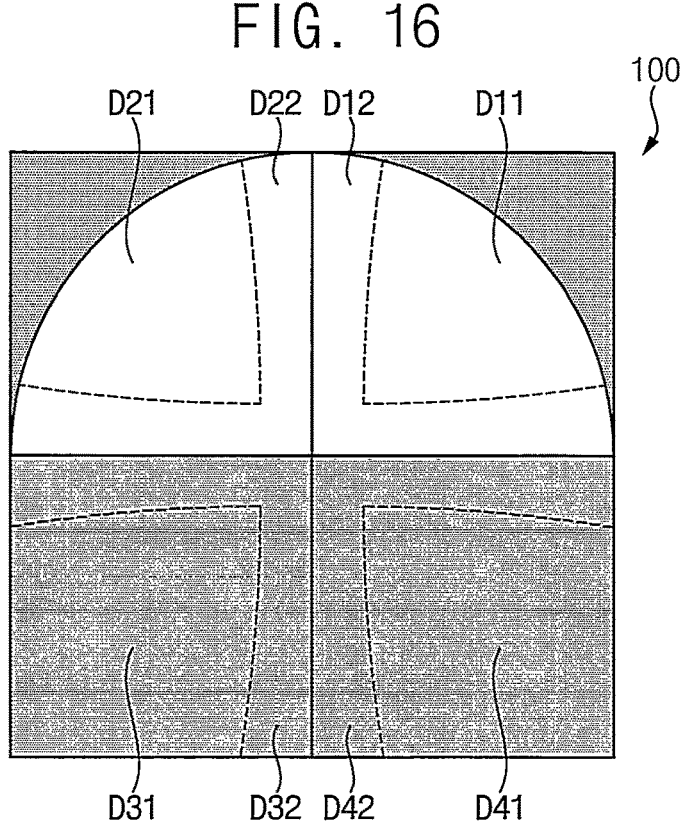
FIG. 16 is a conceptual diagram illustrating a first display image displayed in a first quadrant and a second quadrant of the display area of FIG. 5.
Figure 17:
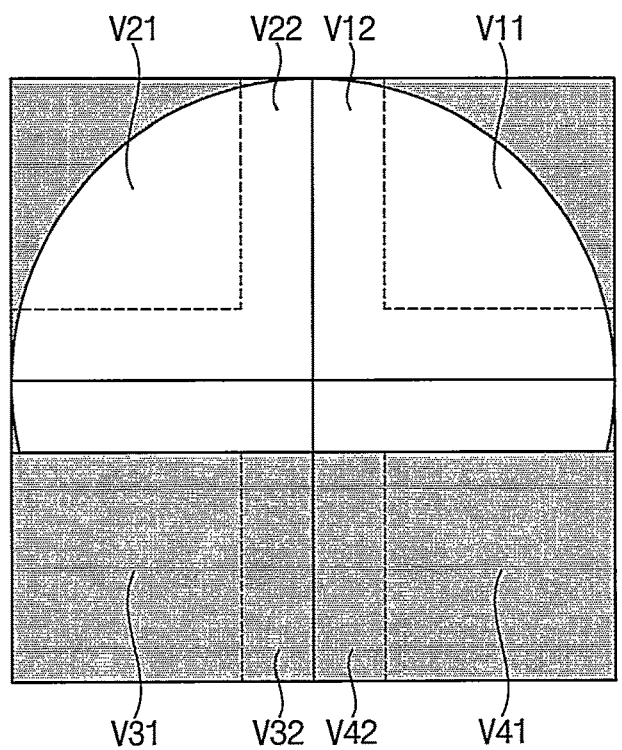
FIG. 17 is a conceptual diagram illustrating a first visual image which is the first display image of FIG. 16 recognized by the user's vision through the lens of FIG. 1.
Figure 18:
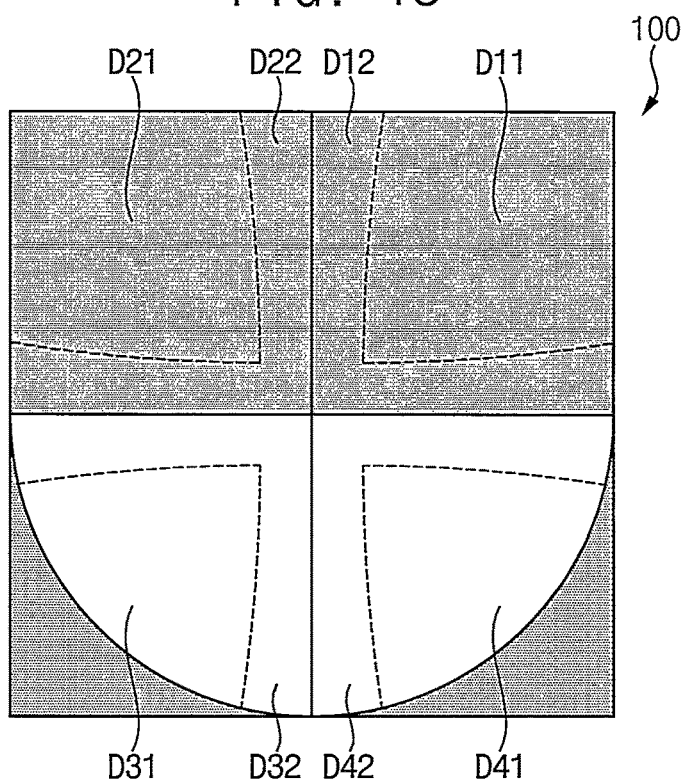
FIG. 18 is a conceptual diagram illustrating a second display image displayed in a third quadrant and a fourth quadrant of the display area of FIG. 5.
Figure 19:
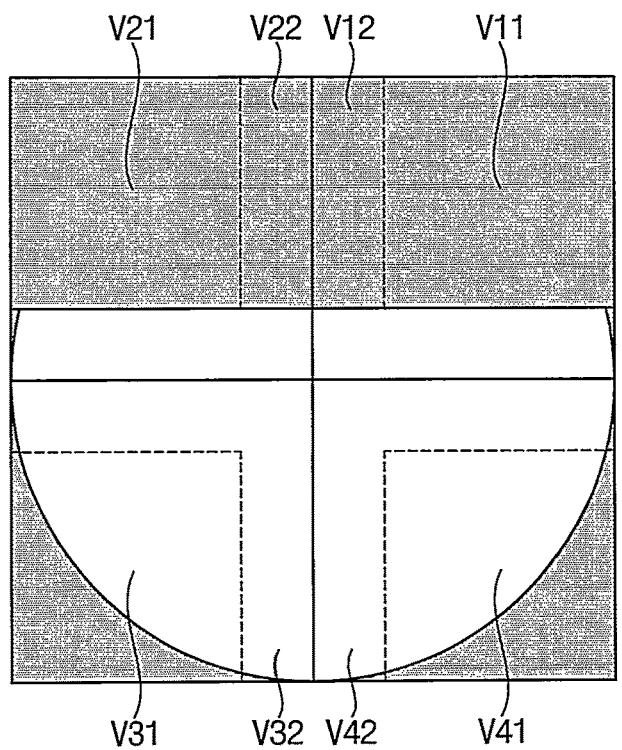
FIG. 19 is a conceptual diagram illustrating a second visual image which is the second display image of FIG. 18 recognized by the user's vision through the lens of FIG. 1.
Figure 20:
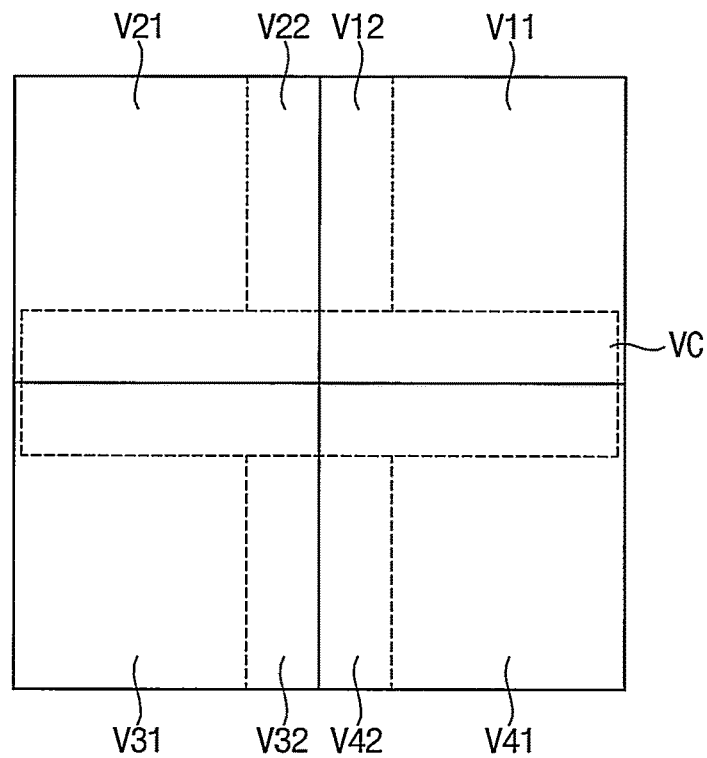
FIG. 20 is a conceptual diagram illustrating a common visual image area in which an area of the first visual image of FIG. 17 and an area of the second visual image of FIG. 19 are overlapped with each other.

FIG. 15 is a timing diagram illustrating a sequence of displaying an image in the display area of FIG. 5. FIG. 16 is a conceptual diagram illustrating a first display image displayed in a first quadrant and a second quadrant of the display area of FIG. 5. FIG. 17 is a conceptual diagram illustrating a first visual image which is the first display image of FIG. 16 recognized by the user's vision through the lens unit 1000 of FIG. 1. FIG. 18 is a conceptual diagram illustrating a second display image displayed in a third quadrant and a fourth quadrant of the display area of FIG. 5. FIG. 19 is a conceptual diagram illustrating a second visual image which is the second display image of FIG. 18 recognized by the user's vision through the lens unit 1000 of FIG. 1. FIG. 20 is a conceptual diagram illustrating a common visual image area in which an area of the first visual image of FIG. 17 and an area of the second visual image of FIG. 19 are overlapped with each other.

The display apparatus, the head mounted display system and the method of driving the display apparatus according to the present embodiment is substantially the same as the display apparatus, the head mounted display system and the method of driving the display apparatus of the previous embodiments explained referring to FIGS. 1 to 14 except for a first display area and a second display area. Thus, the same reference numerals will be used to refer to the same or like parts as those described in the previous embodiment of FIGS. 1 to 14 and any repetitive explanation concerning the above elements will be omitted.

Referring to FIGS. 1 to 8 and 15 to 20, the head mounted display system includes a lens unit 1000, a display apparatus 2000 and a housing 3000.

The display apparatus 2000 includes a display panel 100 and a display panel driver. The display panel driver includes a driving controller 200, a gate driver 300, a gamma reference voltage generator 400, a data driver 500 and an emission driver 600.

The display panel 100 may be divided into four quadrants and the display panel 100 may include a first quadrant area D11 and D12, a second quadrant area D21 and D22, a third quadrant area D31 and D32 and a fourth quadrant area D41 and D42. The display panel 100 may be divided into four areas along a horizontal central line of the display panel 100 and a vertical central line of the display panel 100.

The visual image which is the image recognized to the user's eyes and corresponds to the image displayed on the display panel 100 may also be divided into four areas. The visual image may include a first quadrant area V11 and V12, a second quadrant area V21 and V22, a third quadrant area V31 and V32 and a fourth quadrant area V41 and V42. The visual image may be divided in the same manner as the method in which the display panel 100 is divided into four areas.

As shown in FIG. 15, during a first frame F1, the data driver 500 may apply a first data voltage (Step W1) to the first display area (e.g., the first quadrant area D11 and D12 and the second quadrant area D21 and D22). During a second frame F2, the data driver 500 may apply a second data voltage (Step W2) to the second display area (e.g., the third quadrant area D31 and D32 and the fourth quadrant area D41 and D42).

During the second frame F2, the emission driver 600 may control an emission of light on the first display area (e.g., the first quadrant area D11 and D12 and the second quadrant area D21 and D22) (Step E1) based on the first data voltage such that the first display area emits the light based on the first data voltage. During a third frame F3, the emission driver 600 may control an emission of light on the second display area (e.g., the third quadrant area D31 and D32 and the fourth quadrant area D41 and D42) (Step E2) based on the second data voltage such that the second display area emits the light based on the second data voltage.

Herein, a first visual image V1 may be the image recognized to the user's eye due to the emission (E1) of the first display area during the second frame F2. A second visual image V2 may be the image recognized to the user's eye due to the emission (E2) of the second display area during the third frame F3.

According to the above explained method, the image (e.g., the first visual image V1 and the second visual image V2) may be recognized to the user at a high frequency by the multi-channel lens unit 1000 even when the corresponding image is displayed at a low frequency on the display panel 100 with respect to each display area.

In the present embodiment, the first display area of the display panel 100 may include the first quadrant area D11 and D12 and the second quadrant area D21 and D22, and the second display area of the display panel 100 may include the third quadrant area D31 and D32 and the fourth quadrant area D41 and D42. Although, for example, the first display area may include the first quadrant area D11 and D12 and the second quadrant area D21 and D22, and the second display area may include the third quadrant area D31 and D32 and the fourth quadrant area D41 and D42 in the present embodiment, the present inventive concept may be similarly applied to a case in which the first display area includes the first quadrant area D11 and D12 and the fourth quadrant area D41 and D42 and the second display area includes the second quadrant area D21 and D22 the third quadrant area D31 and D32.

As shown in FIGS. 16 and 18, the first display area (e.g., the first quadrant area D11 and D12 and the second quadrant area D21 and D22) may not be overlapped with the second display area (e.g., the third quadrant area D31 and D32 and the fourth quadrant area D41 and D42) in the plan view.

In contrast, as shown in FIGS. 17 and 19, the area (FIG. 17) of the first visual image recognized to the user due to the emission of the first display area in FIG. 16 may be partially overlapped with the area (FIG. 19) of the second visual image recognized to the user due to the emission of the second display area in FIG. 18.

FIG. 20 represents the common visual image area VC in which the area of the first visual image and the area of the second visual image are overlapped with each other. In the present embodiment, as shown in FIG. 20, the common visual image area VC in which the area of the first visual image and the area of the second visual image are overlapped with each other may extend along the horizontal central line of a combined visual image. Here, the combined visual image is an visual image recognized to the user by combining the first visual image and the second visual image.

According to the present embodiment, the head mounted display system includes the multi-channel lens unit 1000. The image area displayed on the display panel 100 and the image area recognized to the user's eyes may be formed differently by the multi-channel lens unit 1000.

The image may be recognized to the user at a high frequency even when the image is displayed at a low frequency on each display area of the display panel 100 in the head mounted display system including the multi-channel lens unit 1000.

The driving frequency may be set to be relatively low so that the problem that the display luminance is lower than the desired luminance due to insufficient charging of the voltage in the pixels of the display panel 100 may be solved.

In addition, the driving frequency may be set to be relatively low so that the increase of the load of the display panel driver due to the increase of the amount of the transmitted data may be effectively prevented and the increase of the heat generating and the increase of the power consumption due to the shortened operating cycle of the display panel driver may be effectively prevented.

Figure 21:
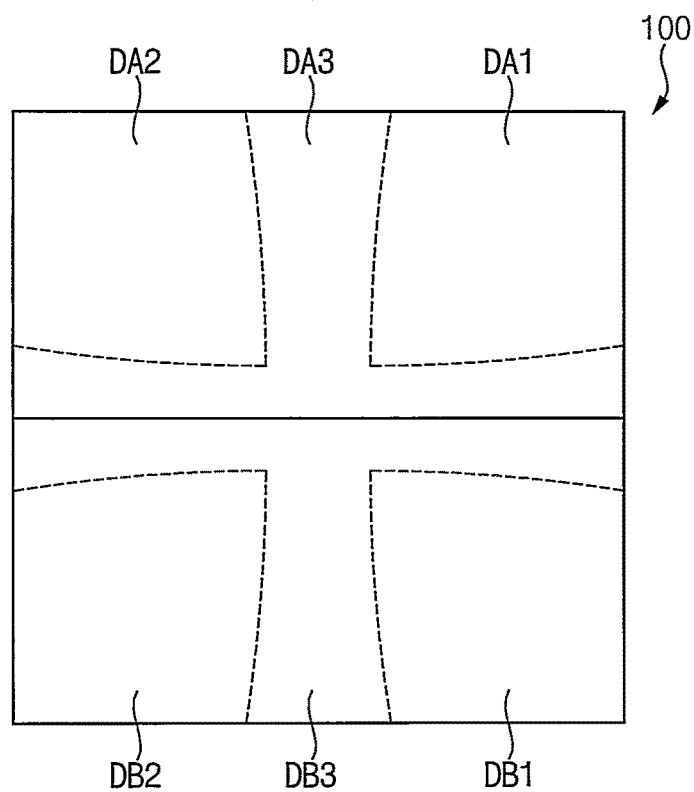
FIG. 21 is a conceptual diagram illustrating a display area of a display panel of a display apparatus according to an embodiment of the present inventive concept.
Figure 22:
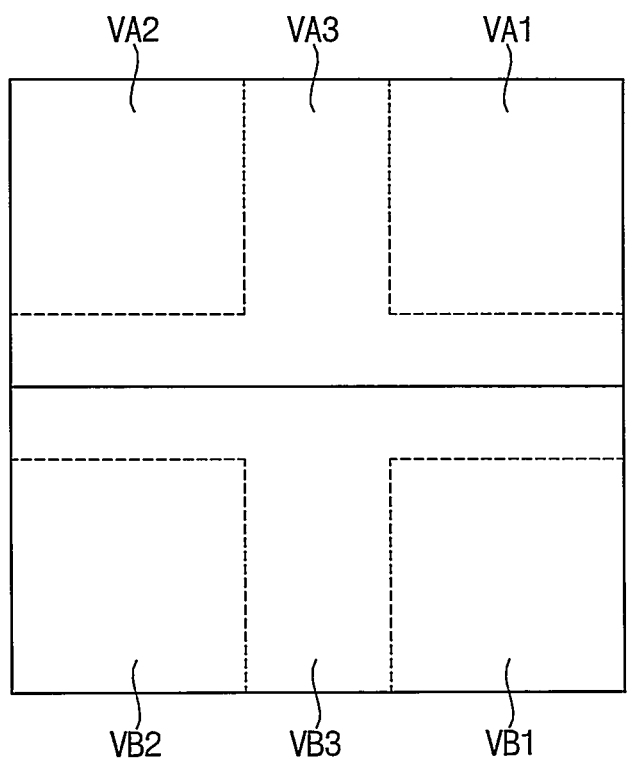
FIG. 22 is a conceptual diagram illustrating a visual area where an image displayed in the display area of FIG. 21 is recognized by a user's vision through a lens.
Figure 23:
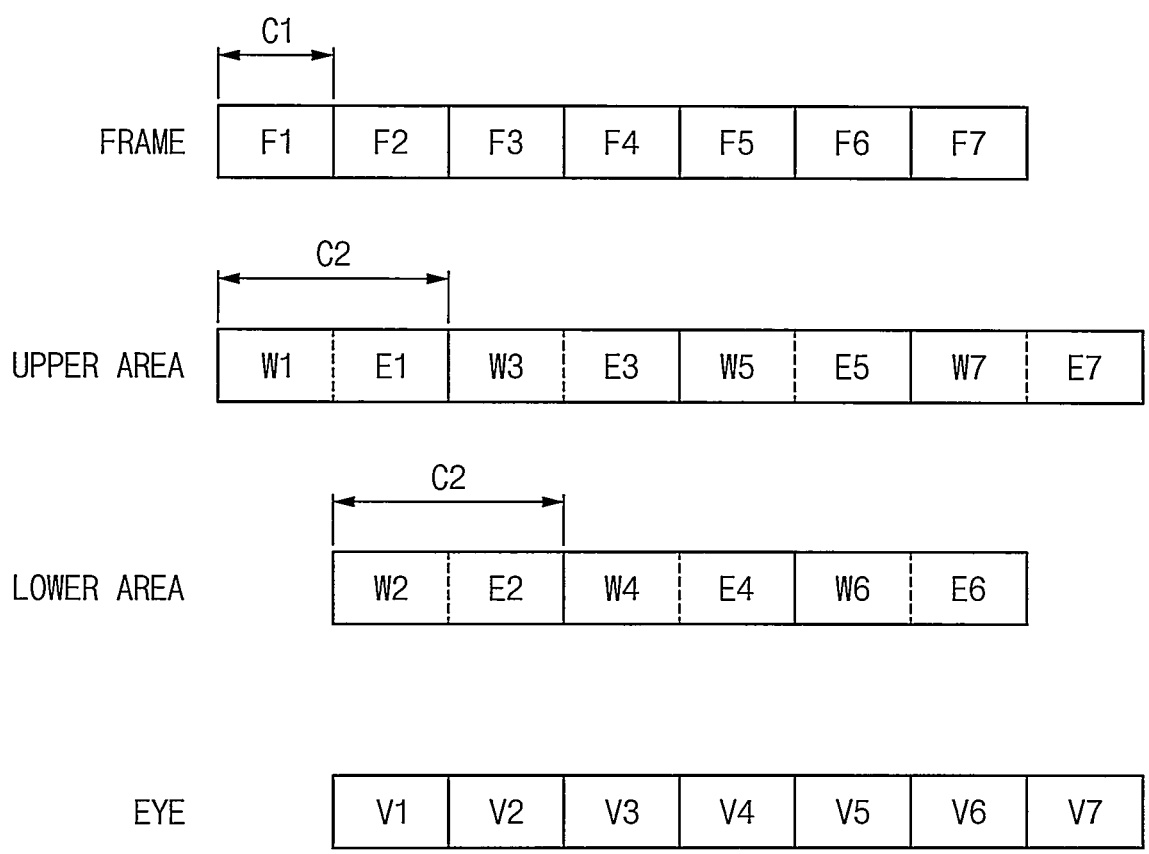
FIG. 23 is a timing diagram illustrating a sequence of displaying an image in the display area of FIG. 21.

FIG. 21 is a conceptual diagram illustrating a display area of a display panel of a display apparatus according to an embodiment of the present inventive concept. FIG. 22 is a conceptual diagram illustrating a visual area where an image displayed in the display area of FIG. 21 is recognized by a user's vision through a lens. FIG. 23 is a timing diagram illustrating a sequence of displaying an image in the display area of FIG. 21.

The display apparatus, the head mounted display system and the method of driving the display apparatus according to the present embodiment is substantially the same as the display apparatus, the head mounted display system and the method of driving the display apparatus of the previous embodiments explained referring to FIGS. 1 to 14 except that the display panel is divided into two areas and except for the first display area and the second display area. Thus, the same reference numerals will be used to refer to the same or like parts as those described in the previous embodiment of FIGS. 1 to 14 and any repetitive explanation concerning the above elements will be omitted.

Referring to FIGS. 1 to 4 and 21 to 23, the head mounted display system includes a lens unit 1000, a display apparatus 2000 and a housing 3000.

The display apparatus 2000 includes a display panel 100 and a display panel driver. The display panel driver includes a driving controller 200, a gate driver 300, a gamma reference voltage generator 400, a data driver 500 and an emission driver 600.

The display panel 100 may be divided into two areas, and the display panel 100 may include an upper area (e.g., an upper half area) DA1, DA2 and DA3 and a lower area (e.g., a lower half area) DB1, DB2 and DB3. The display panel 100 may be divided into two areas along a horizontal central line of the display panel 100. Although the display panel 100 is divided into two areas such as the upper half area and the lower half area along the horizontal central line of the display panel 100 in the present embodiment, the present inventive concept may not be limited thereto. Alternatively, the display panel 100 may be divided into two areas such as a left half area and a right half area along a vertical central line of the display panel 100.

The upper area DA1, DA2 and DA3 may include a first main area DA1 adjacent to a first corner area of the display panel 100, a second main area DA2 adjacent to a second corner area of the display panel 100 and a first sub area DA3 including a vertical portion disposed between the first main area DA1 and the second main area DA2 and a horizontal portion adjacent to the horizontal central line of the display panel 100.

The image displayed in the first main area DA1 and the image displayed in the second main area DA2 may be disposed in an upper area in a visual image recognized to the user's eye. However, the image displayed in the horizontal portion of the first sub area DA3 may be disposed out of the upper area in the visual image.

The lower area DB1, DB2 and DB3 may include a third main area DB1 adjacent to a third corner area of the display panel 100, a fourth main area DB2 adjacent to a fourth corner area of the display panel 100 and a second sub area DB3 including a vertical portion disposed between the third main area DB1 and the fourth main area DB2 and a horizontal portion adjacent to the horizontal central line of the display panel 100.

The image displayed in the third main area DB1 and the image displayed in the fourth main area DB2 may be disposed in a lower area in the visual image recognized to the user's eye. However, the image displayed in the second sub area DB3 may be disposed out of the lower area in the visual image.

The visual image which is the image recognized to the user's eyes and corresponds to the image displayed on the display panel 100 may also be divided into two areas. The visual image may include an upper area (e.g., an upper half area) VA1, VA2 and VA3 and a lower area (e.g., a lower half area) VB1, VB2 and VB3. The visual image may be divided in the same manner as the method in which the display panel 100 is divided into two areas.

As shown in FIG. 23, during a first frame F1, the data driver 500 may apply a first data voltage (Step W1) to the first display area (e.g., the upper area DA1, DA2 and DA3). During a second frame F2, the data driver 500 may apply a second data voltage (Step W2) to the second display area (e.g., the lower area DB1, DB2 and DB3).

During the second frame F2, the emission driver 600 may control an emission of light on the first display area (e.g., the upper area DA1, DA2 and DA3) (Step E1) based on the first data voltage such that the first display area emits the light based on the first data voltage. During a third frame F3, the emission driver 600 may control an emission of light on the second display area (e.g., the lower area DB1, DB2 and DB3) (Step E2) based on the second data voltage such that the second display area emits the light based on the second data voltage.

Herein, a first visual image V1 may be the image recognized to the user's eye due to the emission (E1) of the first display area during the second frame F2. A second visual image V2 may be the image recognized to the user's eye due to the emission (E2) of the second display area during the third frame F3.

According to the above explained method, the image may be recognized to the user at a high frequency by the multi-channel lens unit 1000 even when the image is displayed at a low frequency on each display area of the display panel 100.

In the present embodiment, the first display area may include the upper area DA1, DA2 and DA3, and the second display area may include the lower area DB1, DB2 and DB3.

The first display area (e.g., the upper area DA1, DA2 and DA3) may not be overlapped with the second display area (e.g., the lower area DB1, DB2 and DB3) in the plan view. In contrast, the area of the first visual image recognized to the user due to the emission of the first display area may be partially overlapped with the area of the second visual image recognized to the user due to the emission of the second display area in the plan view.

In the present embodiment, the common visual image area VC in which the area of the first visual image and the area of the second visual image are overlapped with each other may extend along the horizontal central line of a combined visual image. Here, the combined visual image is an visual image recognized to the user by combining the first visual image and the second visual image.

According to the present embodiment, the head mounted display system includes the multi-channel lens unit 1000. The image area displayed on the display panel 100 and the image area recognized to the user's eyes may be formed differently by the multi-channel lens unit 1000.

The image may be recognized to the user at a high frequency even when the image is displayed at a low frequency on each display area of the display panel 100 in the head mounted display system including the multi-channel lens unit 1000.

The driving frequency may be set to be relatively low so that the problem that the display luminance is lower than the desired luminance due to insufficient charging of the voltage in the pixels of the display panel 100 may be solved.

In addition, the driving frequency may be set to be relatively low so that the increase of the load of the display panel driver due to the increase of the amount of the transmitted data may be effectively prevented and the increase of the heat generating and the increase of the power consumption due to the shortened operating cycle of the display panel driver may be effectively prevented.

Figure 24:
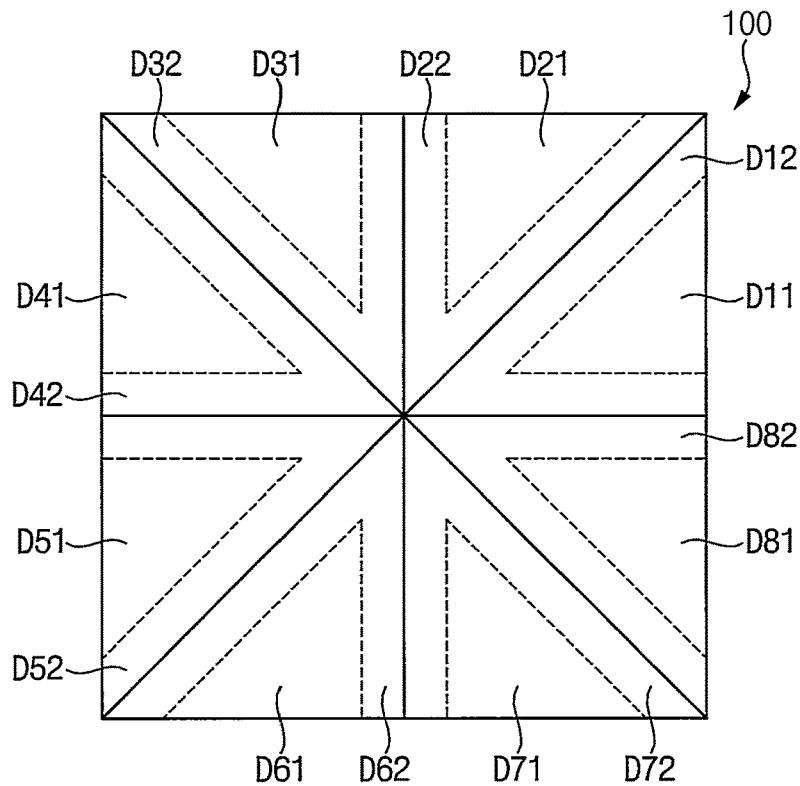
FIG. 24 is a conceptual diagram illustrating a display area of a display panel of a display apparatus according to an embodiment of the present inventive concept.
Figure 25:
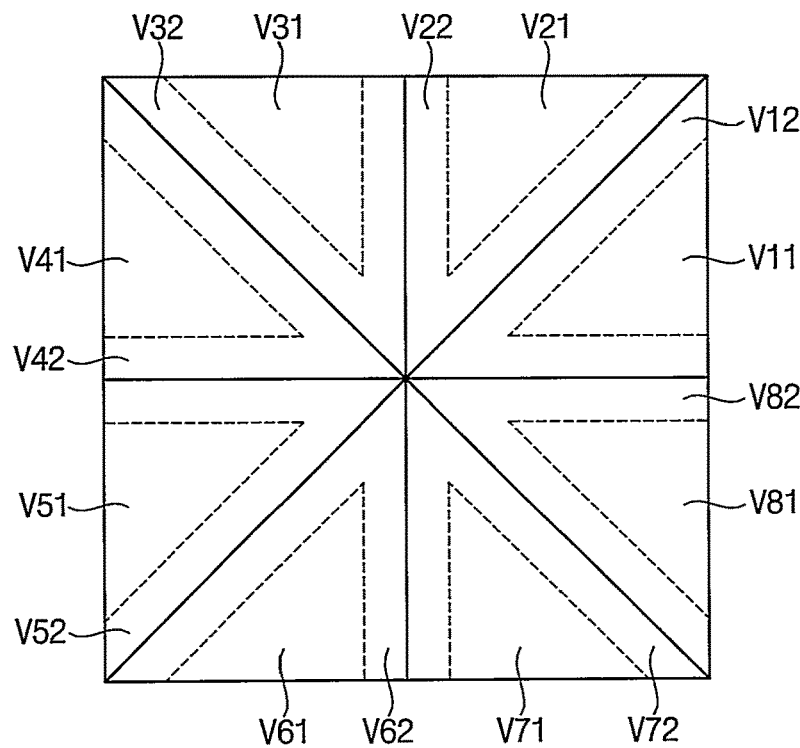
FIG. 25 is a conceptual diagram illustrating a visual area where an image displayed in the display area of FIG. 24 is recognized by a user's vision through a lens.
Figure 26:
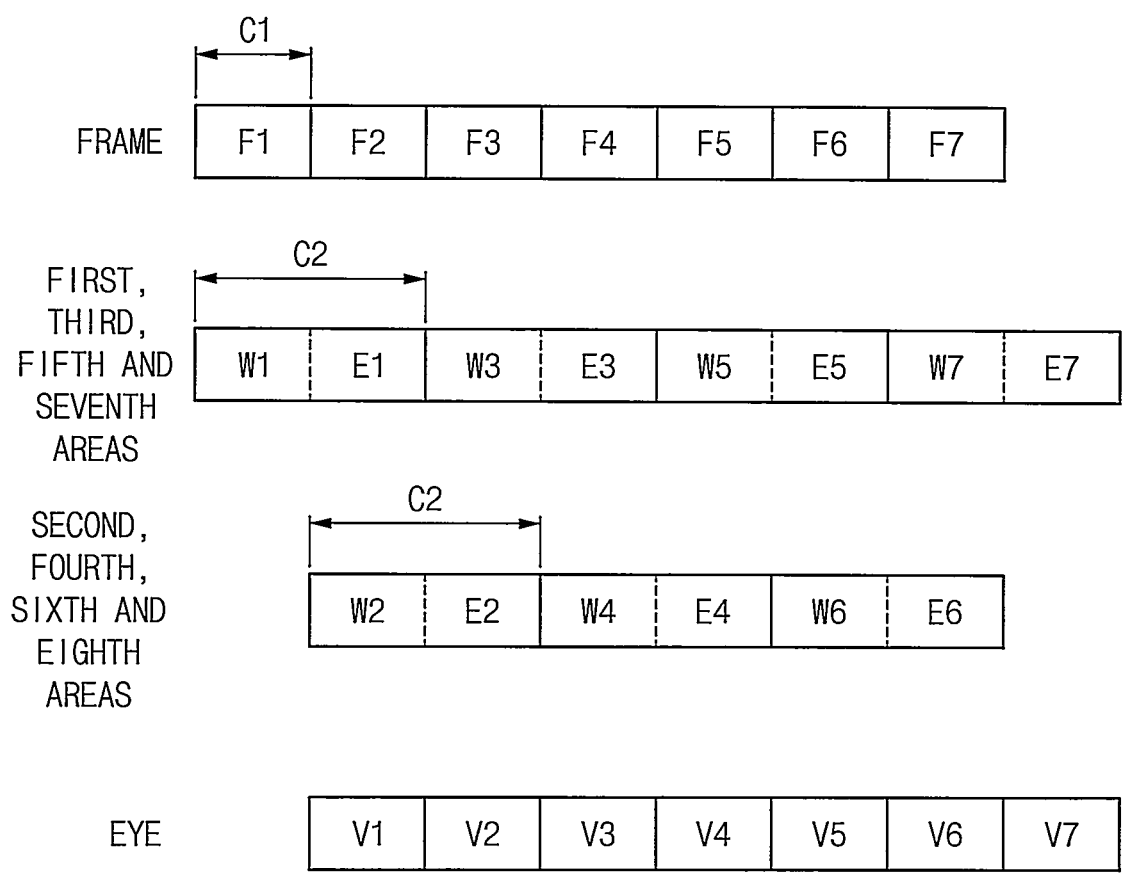
FIG. 26 is a timing diagram illustrating a sequence of displaying an image in the display area of FIG. 24.

FIG. 24 is a conceptual diagram illustrating a display area of a display panel 100 of a display apparatus according to an embodiment of the present inventive concept. FIG. 25 is a conceptual diagram illustrating a visual area where an image displayed in the display area of FIG. 24 is recognized by a user's vision through a lens unit 1000. FIG. 26 is a timing diagram illustrating a sequence of displaying an image in the display area of FIG. 24.

The display apparatus, the head mounted display system and the method of driving the display apparatus according to the present embodiment is substantially the same as the display apparatus, the head mounted display system and the method of driving the display apparatus of the previous embodiment explained referring to FIGS. 1 to 14 except that the display panel is divided into eight areas and except for the first display area and the second display area. Thus, the same reference numerals will be used to refer to the same or like parts as those described in the previous embodiment of FIGS. 1 to 14 and any repetitive explanation concerning the above elements will be omitted.

Referring to FIGS. 1 to 4 and 24 to 26, the head mounted display system includes a lens unit 1000, a display apparatus 2000 and a housing 3000.

The display apparatus 2000 includes a display panel 100 and a display panel driver. The display panel driver includes a driving controller 200, a gate driver 300, a gamma reference voltage generator 400, a data driver 500 and an emission driver 600.

The display panel 100 may be divided into eight areas and the display panel 100 may include first to eighth divided areas D11 to D82. The display panel 100 may include the first to eighth divided areas D11 to D82 that are sequentially rotated around a center point of the display panel 100. For example, each of the first to eighth divided areas D11 to D82 may have an angle of 45 degrees.

A first divided area D11 and D12 may include a first main area D11 and a first sub area D12. The first sub area D12 may be disposed closer to the center point and borders with adjacent divided areas of the display panel 100 compared to the first main area D11.

The image displayed in the first main area D11 may be disposed in a first divided area V11 and V12 in a visual image recognized to the user's eye. However, the image displayed in the first sub area D12 may be disposed out of the first divided area V11 and V12 in the visual image.

A second divided area D21 and D22 may include a second main area D21 and a second sub area D22. The second sub area D22 may be disposed adjacent to the center point and borders with adjacent divided areas of the display panel 100 compared to the second main area D21.

The image displayed in the second main area D21 may be disposed in a second divided area V21 and V22 in a visual image recognized to the user's eye. However, the image displayed in the second sub area D22 may be disposed out of the second divided area V21 and V22 in the visual image.

The visual image which is the image recognized to the user's eyes and corresponds to the image displayed on the display panel 100 may also be divided into eight areas. The visual image may include first to eighth divided areas V11 to V82. The visual image may be divided in the same manner as the method in which the display panel 100 is divided into eight areas.

As shown in FIG. 26, during a first frame F1, the data driver 500 may apply a first data voltage (Step W1) to the first display area (e.g., first, third, fifth and seventh divided areas D11, D12, D31, D32, D51, D52, D71 and D72). During a second frame F2, the data driver 500 may apply a second data voltage (Step W2) to the second display area (e.g., second, fourth, sixth and eighth divided areas D21, D22, D41, D42, D61, D62, D81 and D82).

During the second frame F2, the emission driver 600 may control an emission of light on the first display area (e.g., the first, third, fifth and seventh divided areas D11, D12, D31, D32, D51, D52, D71 and D72) (Step E1) based on the first data voltage such that the first display area emits the light based on the first data voltage. During a third frame F3, the emission driver 600 may control an emission of light on the second display area (e.g., the second, fourth, sixth and eighth divided areas D21, D22, D41, D42, D61, D62, D81 and D82) (Step E2) based on the second data voltage such that the second display area emits the light based on the second data voltage.

Herein, a first visual image V1 may be the image recognized to the user's eye due to the emission (E1) of the first display area during the second frame F2. A second visual image V2 may be the image recognized to the user's eye due to the emission (E2) of the second display area during the third frame F3.

According to the above explained method, the image may be recognized to the user at a high frequency by the multi-channel lens unit 1000 even when the image is displayed at a low frequency on each display area of the display panel 100.

In the present embodiment, the first display area may include the first, third, fifth and seventh divided areas D11, D12, D31, D32, D51, D52, D71 and D72 having vertices meeting at the center point of the display panel 100, and the second display area may include the second, fourth, sixth and eighth divided areas D21, D22, D41, D42, D61, D62, D81 and D82 having vertices meeting at the center point of the display panel 100.

The first display area (e.g., the first, third, fifth and seventh divided areas D11, D12, D31, D32, D51, D52, D71 and D72) may not be overlapped with the second display area (e.g., the second, fourth, sixth and eighth divided areas D21, D22, D41, D42, D61, D62, D81 and D82) in the plan view. In contrast, the area of the first visual image recognized to the user due to the emission of the first display area may be partially overlapped with the area of the second visual image recognized to the user due to the emission of the second display area in the plan view.

In the present embodiment, a common visual image area in which the area of the first visual image and the area of the second visual image are overlapped with each other may have a union of a cross shape along the horizontal central line of a combined visual image and the vertical central line of the combined visual image and an X-shape along a first diagonal line of the combined visual image and a second diagonal line of the combined visual image. Here, the combined visual image is an visual image recognized to the user by combining the first visual image and the second visual image.

According to the present embodiment, the head mounted display system includes the multi-channel lens unit 1000. The image area displayed on the display panel 100 and the image area recognized to the user's eyes may be formed differently by the multi-channel lens unit 1000.

The visual image may be recognized to the user at a high frequency even when the image is displayed at a low frequency on each display area of the display panel 100 in the head mounted display system including the multi-channel lens unit 1000.

The driving frequency may be set to be relatively low so that the problem that the display luminance is lower than the desired luminance due to insufficient charging of the voltage in the pixels of the display panel 100 may be solved.

In addition, the driving frequency may be set to be relatively low so that the increase of the load of the display panel driver due to the increase of the amount of the transmitted data may be effectively prevented and the increase of the heat generating and the increase of the power consumption due to the shortened operating cycle of the display panel driver may be effectively prevented.

According to the embodiments of the display apparatus, the head mounted display system and the method of driving the display apparatus, the display quality may be enhanced and the heat generating and the power consumption may be reduced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising:
    a display panel;
    a data driver which applies a first data voltage to a first display area of the display panel during a first frame and applies a second data voltage to a second display area of the display panel during a second frame, wherein the first display area includes a first-first sub display area and a first-second sub display area, which meet each other only at a center of the display panel, and the second display area includes a second-first sub display area and a second-second sub display area, which meet each other only at the center of the display panel; and
    an emission driver which controls an emission of light on the first display area based on the first data voltage during the second frame and an emission of light on the second display area based on the second data voltage during a third frame,
    wherein an area of a first visual image recognized to a user due to the emission of the light on the first display area is partially overlapped with an area of a second visual image recognized to the user due to the emission of the light on the second display area in a plan view,
    wherein a frequency of an image in the overlapped area between the first visual image and the second visual image is the same as a frequency of input image data input to the display apparatus, and two times of a frequency of other images in the first visual image and the second visual image.

2. The display apparatus of claim 1, wherein the first display area and the area of the first visual image are different from each other in the plan view, and
    wherein the second display area and the area of the second visual image are different from each other in the plan view.

3. The display apparatus of claim 1, wherein the first display area is not overlapped with the second display area in the plan view.

4. The display apparatus of claim 1, wherein the display panel is divided into four areas, and
    wherein the four areas include a first quadrant area, a second quadrant area, a third quadrant area and a fourth quadrant area.

5. The display apparatus of claim 4, wherein the first display area includes the first quadrant area and the third quadrant area, and
    wherein the second display area includes the second quadrant area and the fourth quadrant area.

6. The display apparatus of claim 5, wherein the first quadrant area includes a first main area adjacent to a corner area of the display panel and a first sub area adjacent to a center point of the display panel,
    wherein an image displayed in the first main area is disposed in a first quadrant area in the first visual image, and
    wherein an image displayed in the first sub area is disposed out of the first quadrant area in the first visual image.

7. The display apparatus of claim 5, wherein a common visual image area in which the area of the first visual image and the area of the second visual image are overlapped with each other has a cross shape along a horizontal central line of a combined visual image and a vertical central line of the combined visual image, and the combined visual image is an visual image recognized to the user by combining the first visual image and the second visual image.

8. The display apparatus of claim 4, wherein the first display area includes the first quadrant area and the second quadrant area, and
    wherein the second display area includes the third quadrant area and the fourth quadrant area.

9. The display apparatus of claim 8, wherein the first quadrant area includes a first main area adjacent to a corner area of the display panel and a first sub area adjacent to a center point of the display panel, wherein an image displayed in the first main area is disposed in a first quadrant area in the first visual image, and wherein an image displayed in the first sub area is disposed out of the first quadrant area in the first visual image.

10. The display apparatus of claim 1, wherein the display panel is divided into eight areas, and wherein the display panel includes first to eighth divided areas which are sequentially rotated around a center point of the display panel.

11. The display apparatus of claim 10, wherein the first display area includes the first, third, fifth and seventh divided areas having vertices which meet at the center point of the display panel, and wherein the second display area includes the second, fourth, sixth and eighth divided areas having vertices which meet at the center point of the display panel.

12. The display apparatus of claim 11, wherein the first divided area includes a first main area and a first sub area, wherein the first sub area is disposed closer to the center point of the display panel and adjacent divided areas compared to the first main area, wherein an image displayed in the first main area is disposed in a first divided area in the first visual image when the first visual image is divided corresponding to the divided areas of the first display area, and wherein an image displayed in the first sub area is disposed out of the first divided area in the first visual image when the first visual image is divided corresponding to the divided areas of the first display area.

13. A head mounted display system comprising:

a display apparatus including a display panel; and a multi-channel optical system which refracts and reflects light and transmits the light to a user's eye, wherein an area of a first visual image recognized to the user due to an emission of light on a first display area of the display panel is partially overlapped with an area of a second visual image recognized to the user due to an emission of light on a second display area of the display panel, wherein the first display area includes a first-first sub display area and a first-second sub quadrant area, which meet each other only at a center of the display panel, and the second display area includes a second-first sub display area and a second-second sub quadrant area, which meet each other only at the center of the display panel, wherein the first display area is not overlapped with the second display area in a plan view, and wherein a frequency of an image in the overlapped area between the first visual image and the second visual image is the same as a frequency of input image data input to the display apparatus, and two times of a frequency of other images in the first visual image and the second visual image.

14. The head mounted display system of claim 13, wherein the display apparatus further comprises:

a data driver which applies a first data voltage to the first display area of the display panel during a first frame and applies a second data voltage to the second display area of the display panel during a second frame; and an emission driver which controls the emission of the light on the first display area based on the first data voltage during the second frame and the emission of the light on the second display area based on the second data voltage during a third frame.

15. The head mounted display system of claim 13, wherein the multi-channel optical system is configured to transmit a light emitted from the display panel to the user's eye through two refractions and two reflections.

16. A method of driving a display apparatus, the method comprising:

applying a first data voltage to a first display area of a display panel during a first frame;

applying a second data voltage to a second display area of the display panel during a second frame;

emitting light on the first display area based on the first data voltage during the second frame; and emitting light on the second display area based on the second data voltage during a third frame, wherein the first display area includes a first-first sub display area and a first-second sub quadrant area, which meet each other only at a center of the display panel, and the second display area includes a second-first sub display area and a second-second sub quadrant area, which meet each other only at the center of the display panel, wherein an area of a first visual image recognized to a user due to an emission of the light on the first display area is partially overlapped with an area of a second visual image recognized to the user due to the light on an emission of the second display area, wherein a frequency of an image in the overlapped area between the first visual image and the second visual image is the same as a frequency of input image data input to the display apparatus, and two times of a frequency of other images in the first visual image and the second visual image.

17. A display apparatus comprising:

a display panel divided into a first display area and a second display area;

wherein the first display area includes a first-first sub display area and a first-second sub quadrant area, which meet each other only at a center of the display panel, and the second display area includes a second-first sub display area and a second-second sub quadrant area, which meet each other only at the center of the display panel, wherein the first display area includes a first main area and a first sub area, and the first sub area is disposed closer to the second display area compared to the first main area, wherein the second display area includes a second main area and a second sub area, and the second sub area is disposed closer to the first display area compared to the second main area, wherein an image displayed on the first main area and an image displayed on the second sub area have a common part, and an image displayed on the second main area and an image displayed on the first sub area have a common part, wherein each of a frequency of the common part between the image displayed on the first main area and the image displayed on the second sub area and a frequency of the common part between the image displayed on the second main area and the image displayed on the first sub area is the same as a frequency of input image data input to the display apparatus, and two times of a frequency of other images displayed on the first main area, the second sub area, the second main area, and the first sub area.

\* \* \* \* \*